US009378382B1

(12) United States Patent
Swamidass

(10) Patent No.: US 9,378,382 B1
(45) Date of Patent: Jun. 28, 2016

(54) METHODS AND SYSTEMS FOR ENCRYPTING PRIVATE DATASETS USING CRYPTOSETS

(71) Applicant: Washington University, St. Louis, MO (US)

(72) Inventor: Sanjay Joshua Swamidass, St. Louis, MO (US)

(73) Assignee: WASHINGTON UNIVERSITY, St. Louis, MO (US)

( * ) Notice: Subject to any disclaimer, the term of this patent is extended or adjusted under 35 U.S.C. 154(b) by 22 days.

(21) Appl. No.: 14/530,312

(22) Filed: Oct. 31, 2014

Related U.S. Application Data

(60) Provisional application No. 61/898,288, filed on Oct. 31, 2013.

(51) Int. Cl.
| G06F 7/04 | (2006.01) |
| G06F 21/60 | (2013.01) |
| G06F 21/62 | (2013.01) |

(52) U.S. Cl.
CPC .......... *G06F 21/602* (2013.01); *G06F 21/6218* (2013.01)

(58) Field of Classification Search
CPC ............................ G06F 21/602; G06F 21/6218
USPC ........................................................ 726/26
See application file for complete search history.

(56) References Cited

U.S. PATENT DOCUMENTS

| 6,381,696 B1 | 4/2002 | Doyle |
| 6,925,182 B1 | 8/2005 | Epstein |
| 7,139,723 B2 | 11/2006 | Conkwright et al. |
| 2013/0013618 A1 | 1/2013 | Heller et al. |

OTHER PUBLICATIONS

Huang et al., "Efficient Secure Computation with Garbled Circuits," Invited paper in 7th International Conference on Information Systems Security, 2011, pp. 1-21.
Johnson et al., "Using global unique identifiers to link autism collections," J Am Med Inform Assoc, 2010, pp. 389-695, vol. 17.
Kuzu et al., "A practical approach to achieve private medical record linkage in light of public resources," J Am Med Inform Assoc, 2013 pp. 285-292, vol. 20.

*Primary Examiner* — Mohammad W Reza
(74) *Attorney, Agent, or Firm* — Polsinelli PC

(57) ABSTRACT

Methods and systems for generating an encrypted representation of a private dataset for comparison with a second encrypted representation of a second private dataset to determine the overlap between the private dataset and the second private dataset are disclosed. More specifically, methods and systems for generating and comparing cryptosets that include histograms of the frequency of occurrence of public identifiers generated using private identifiers from the private dataset are disclosed. Each public identifier may be generated from a private identifier using a degenerate mapping rule such as a hash value or code. Cryptosets generated in this manner retain sufficient information to estimate the overlap between the private databases associated with the cryptosets, but maintain the privacy of the respective private databases by virtue of the many-to-one relationship between all private and public identifiers used to generate the cryptosets.

20 Claims, 12 Drawing Sheets

METHODS AND SYSTEMS FOR ENCRYPTING PRIVATE DATASETS USING CRYPTOSETS

CROSS REFERENCE TO RELATED APPLICATIONS

The present application claims the benefit of and priority to U.S. Provisional Patent Application 61/898,288, entitled "Method and Systems for Encrypting Private Datasets Using Cryptosets", filed Oct. 31, 2013, which is hereby incorporated by reference in its entirety into the present application.

FIELD OF THE INVENTION

The invention generally relates to methods of estimating overlap of private data sets by sharing and comparing related cryptosets.

BACKGROUND OF THE INVENTION

Sharing private data is increasingly necessary for scientific progress in fields that are dominated by sensitive information. In many instances, the potential value of sharing data depends on the overlap between private datasets. The amount of overlap may factor into a decision to work through the institutional, legal, or ethical regulations governing access to private data.

Overlap estimates of the contents of databases may be used to provide evidence of non-independent samples in private databases such as rare disease registries. Such evidence has previously been difficult to generate without sharing the data. If the degree of overlap between private data sets could be estimated while maintaining the privacy of the underlying data, the benefits of investing in formal data sharing could be determined.

Existing methods of estimating overlap between private data sets either calculate exact overlap, or estimate overlap using a Bloom filter. The methods of calculating exact overlap focus on public identifiers that retain a one-to-one (or nearly one-to-one) relationship to the corresponding private identifiers. These efforts attempted to secure the private information in the database by using a one-way hash to generate public identifiers, so it is non-trivial to recover private identifiers from a list of public identifiers. However, this strategy is vulnerable to attack by enumerating valuable or common private identifiers (or just private identifiers of interest), and searching the list of public identifiers in a database for these valuable/common identifiers to see if the corresponding public identifiers is in the private dataset. Comprehensive attacks, which explore all possible private identifiers, may also be used to identify private information in a database encrypted using certain hash functions. Unfortunately, these comprehensive attacks work on any method that exactly computes the overlap between private datasets, including other cryptographic protocols like scrambled circuits. Countering any of these types of attacks requires keeping secret either the public identifiers, the hash function, or password protecting the public database, a solution that is perfectly acceptable for trusted environments, but inadequate for public, untrusted environments. Overlap estimates based on Bloom filters may be inaccurate with larger data sets and may lack a statistical framework for calculating significance, error, and information risk.

Several new ways of analyzing screening data have been developed. These methods include strategies for identifying active molecules from primary screens, which leverage information from fingerprints, scaffold groupings, economic modeling, and improved processing of raw data. These methods also include automated strategies of organizing screening data into workflows and a series of powerful strategies for visualizing how biological activity maps to chemical space. Finding ways to securely share relevant chemical information about screening data that leaves the structures blinded could open the door to valuable collaborative work, with the hope of both reducing cost and improving the value extracted from chemical data.

A suitable method of securely sharing databases should be sufficiently informative about the private datasets, thereby enabling computation of their overlap. Even a noisy estimate of overlap is informative if it is accurate enough to inform decisions about data sharing. The database sharing method's estimates of overlap should be stable, with a tunable accuracy at the same resolution for both small and large datasets. The database sharing method should be secure, making it difficult to determine the membership of any specific entity in a private dataset. Critically, security considerations suggest that overlap estimates should not be exact, but instead should be intrinsically noisy. Finally, the database sharing method should be public—neither relying on secret encrypted database passwords, private hash functions, nor back-and-forth message passing—with summaries publishable in public spaces.

Therefore, there is a need for encryption of private datasets that does not rely on the secrecy of the public identifiers or the method of generating the public identifiers and is further resistant to various methods of deducing private dataset elements such as private identifiers.

SUMMARY OF INVENTION

In one aspect, a method for generating an encrypted representation of a private chemical dataset for comparison with a second encrypted representation of a second private chemical dataset to determine the overlap between the private chemical dataset and the second private chemical dataset in a secure manner is provided. The method may include receiving an encryption request at at least one processing system. The encryption request may include a plurality of private entries. Each of the private entries may specify an individual chemical molecule structure of the private chemical dataset. The method may further include determining a plurality of relationships between the plurality of private entries according to a predetermined relationship rule. Each relationship represents a connection between one private entry and a related private entry from the plurality of private entries. The method may further include creating a relationship network that may include a plurality of nodes and connections between nodes. Each node may represent a category of chemical molecule structure according to the predetermined relationship rule, and each connection may represent a connection between two categories according to the predetermined relationship rule. The method may further include assigning each private entry to one of the plurality of nodes of the relationship network, producing a chemical cryptoset that may include the relationship network and the number of private entries assigned to each node of the relationship network, and transmitting the chemical cryptoset to a remote computing device. The one or more private entry elements may specify the individual chemical molecule using a chemical notation format chosen from: SMILES, SLN, WLN, ROSDAL, and InChI. The predetermined relationship rule may be chosen from: a structural neighbor relationship rule, a scaffold relationship rule, a scaffold tree relationship rule, a scaffold network relationship rule, and an R-group relationship rule. The structural neighbor relationship rule may include a similarity metric chosen from Tanimoto similarity, Tversky similarity, Hamming similarity, and Euclidian similarity. The scaffold relationship rule may include: forming a scaffold for each of the private entries by removing all R-groups comprising side chains and retaining all rings and linkers of each chemical molecule structure specified by each private data entry, and associating the scaffold with the private entry; comparing each scaffold to all other scaffolds formed from all of the other private entries; assigning a scaffold group to each subset of private entries associated with matching scaffold structures; and assigning one of the nodes of the relationship network to each scaffold group. The scaffold tree relationship rule may include: forming at least one scaffold group and assigning one of the nodes of the relationship network to each scaffold group according to the scaffold relationship rule; and combining all nodes assigned to duplicate scaffolds by assigning all non-duplicate connections of a matching pair of nodes to a first matching node and deleting a second matching node of the matching pair of nodes. For each node, the scaffold tree relationship rule may further include: decomposing the assigned scaffold of the node by removing a chemical substructure chosen from a ring or a linker from the assigned scaffold to form a first decomposed scaffold according to a scaffold tree decomposition rule; assigning a first additional node to the first decomposed scaffold and assigning a connection between the node and the first additional node; and iteratively decomposing each successive scaffold of each successive node to form a subsequent decomposed scaffold; assigning a subsequent node to the subsequent decomposed scaffold; and assigning an additional connection between the previous node and the subsequent node. The scaffold tree decomposition rule may uniquely identify a single chemical substructure to be removed from each scaffold and may terminate decomposition if the scaffold consists of a single ring or linker. The scaffold network relationship rule may include: forming at least one scaffold group and assigning one of the nodes of the relationship network to each scaffold group according to the scaffold relationship rule; and combining all nodes assigned to duplicate scaffolds by assigning all non-duplicate connections of a matching pair of nodes to a first matching node and deleting a second matching node of the matching pair of nodes. For each node, the scaffold network relationship rule may further include iteratively decomposing the assigned scaffold of the node by removing a chemical substructure chosen from a ring or a linker from the assigned scaffold to form at least one decomposed scaffold according to a scaffold network decomposition rule; assigning an additional node to each decomposed scaffold and assigning a connection between the node and each additional node; and iteratively decomposing each successive scaffold of each successive node to form at least one subsequent decomposed scaffold according to the scaffold network decomposition rule, assigning a subsequent node to each subsequent decomposed scaffold, and assigning an additional connection between the successive node and each subsequent node. The scaffold network decomposition rule may identify all possible single chemical substructures to be removed from a higher-order scaffold and may specify at least one decomposition of the higher-order scaffold. The scaffold network decomposition rule may include removing one of the possible single chemical substructures from the higher-order scaffold and terminating decomposition if the higher-order scaffold consists of a single ring or linker. The R-group relationship rule may include: forming at least one scaffold group and assigning one of the nodes of the relationship network to each scaffold group according to the scaffold relationship rule; comparing all R-groups within a collection of R-groups removed from all individual chemical molecule structures specified by each of the plurality of private entries and assigning an additional node to each non-duplicate R-group within the collection of R-groups; and for each node assigned to a scaffold group, adding a connection between the node assigned to the scaffold group and each node assigned to an R-group removed from any of the private entries associated with the scaffold of the scaffold group.

In another aspect, a system for generating an encrypted representation of a private chemical dataset for comparison with a second encrypted representation of a second private chemical dataset to determine the overlap between the private chemical dataset and the second private chemical dataset in a secure manner is provided. The system may include: at least one processor; at least one data storage system; and an application executed by the at least one processor. The application may be executed by the at least one processor to: receive an encryption request at at least one processing system; determine a plurality of relationships between the plurality of private entry elements according to a predetermined relationship rule; create a relationship network comprising a plurality of nodes and connections between nodes; assign each private entry to one of the plurality of nodes of the relationship network; produce a chemical cryptoset that may include the relationship network and the number of chemical molecules assigned to each node of the relationship network; and transmit the chemical cryptoset to a remote computing device. The encryption request may include a plurality of private entries. Each of the private entries may specify an individual chemical molecule structure of the private chemical dataset. Each relationship may represent a connection between one private entry and a related private entry from the plurality of private entries. Each node may represent a category of chemical molecule structure according to the predetermined relationship rule, and each connection may represent a connection between two categories according to the predetermined relationship rule. The one or more private entries may specify the individual chemical molecule using a chemical notation format chosen from: SMILES, SLN, WLN, ROSDAL, and InChI. The predetermined relationship rule may be chosen from: a structural neighbor relationship rule, a scaffold relationship rule, a scaffold tree relationship rule, a scaffold network relationship rule, and an R-group relationship rule. The structural neighbor relationship rule may include a similarity metric chosen from Tanimoto similarity, Tversky similarity, Hamming similarity, and Euclidian similarity. The scaffold relationship rule may include: forming a scaffold for each of the private entries by removing all R-groups comprising side chains and retaining all rings and linkers of each chemical molecule structure specified by each private data entry, and associating the scaffold with the private entry; comparing each scaffold to all other scaffolds formed from all of the other private entries; assigning a scaffold group to each subset of private entries associated with matching scaffold structures; and assigning one of the nodes of the relationship network to each scaffold group. The scaffold tree relationship rule may include: forming at least one scaffold group and assigning one of the nodes of the relationship network to each scaffold group according to the scaffold relationship rule; and combining all nodes assigned to duplicate scaffolds by assigning all non-duplicate connections of a matching pair of nodes to a first matching node and deleting a second matching node of the matching pair of nodes. For each node, the scaffold tree relationship rule may further include: decomposing the assigned scaffold of the node by removing a chemical substructure chosen from a ring or a linker from the assigned scaffold to form a first decomposed scaffold according to a scaffold tree decomposition rule; assigning a first additional node to the first decomposed scaffold and assigning a connection between the node and the first additional node; and iteratively decomposing each successive scaffold of each successive node to form a subsequent decomposed scaffold, assigning a subsequent node to the subsequent decomposed scaffold, and assigning an additional connection between the previous node and the subsequent node. The scaffold tree decomposition rule may uniquely identify a single chemical substructure to be removed from each scaffold and may terminate decomposition if the scaffold consists of a single ring or linker. The scaffold network relationship rule may include: forming at least one scaffold group and assigning one of the nodes of the relationship network to each scaffold group according to the scaffold relationship rule; and combining all nodes assigned to duplicate scaffolds by assigning all non-duplicate connections of a matching pair of nodes to a first matching node and deleting a second matching node of the matching pair of nodes. For each node, the scaffold network relationship rule may include: iteratively decomposing the assigned scaffold of the node by removing a chemical substructure chosen from a ring or a linker from the assigned scaffold to form at least one decomposed scaffold according to a scaffold network decomposition rule; assigning an additional node to each decomposed scaffold and assigning a connection between the node and each additional node; and iteratively decomposing each successive scaffold of each successive node to form at least one subsequent decomposed scaffold according to the scaffold network decomposition rule, assigning a subsequent node to each subsequent decomposed scaffold, and assigning an additional connection between the successive node and each subsequent node. The scaffold network decomposition rule may identify all possible single chemical substructures to be removed from a higher-order scaffold and may specify at least one decomposition of the higher-order scaffold that may include removing one of the possible single chemical substructures from the higher-order scaffold and may further terminate decomposition if the higher-order scaffold consists of a single ring or linker. The R-group relationship rule may include: forming at least one scaffold group and assigning one of the nodes of the relationship network to each scaffold group according to the scaffold relationship rule; comparing all R-groups within a collection of R-groups removed from all individual chemical molecule structures specified by each of the plurality of private entries and assigning an additional node to each non-duplicate R-group within the collection of R-groups; and for each node assigned to a scaffold group, add a connection between the node assigned to the scaffold group and each node assigned to an R-group removed from any of the private entries associated with the scaffold of the scaffold group.

In an additional aspect, a method for generating an encrypted representation of a private dataset for comparison with a second encrypted representation of a second private dataset to determine the overlap between the private dataset and the second private dataset in a secure manner is provided. The method may include: receiving an encryption request at at least one processing system; regularizing each private entry to produce a plurality of private identifiers using a regularization rule; converting each private identifier to one of a plurality of public identifiers using a degenerate mapping rule to produce a list of public identifiers corresponding to the plurality of private identifiers; producing a cryptoset comprising a plurality of elements; and transmitting the cryptoset to a remote computing device. The encryption request may include a plurality of private entries, and each of the private entries may include one or more private entry elements corresponding to an individual item of the private dataset. Each of the plurality of private identifiers may include an alphanumeric string with a standard format. One or more of the plurality of private identifiers may be mapped to each public identifier of the plurality of public identifiers. Each element may include one public identifier and a total number of repeated occurrences of the one public identifier among the plurality of public identifiers. Each private entry element may be chosen from at least one of: a personal name, an address, a birth date, a gender, an identifying number, an account number, a medical data entry, a grade, a test score, a credit record, an account balance, a chemical structure, and a name of a chemical molecule. The standard format of the private identifier may be an alphanumeric string that may include one or more concatenated substrings, and each of the substrings may include at least a portion of one private entry element from the private entry. The regularization rule may be chosen from: assigning a first subset of one private entry element to the private identifier; assigning the first subset of the one private entry element to a first substring; assigning a second subset of the one private entry element to a second substring; assigning a third subset of a second private entry element to a third substring; concatenating one or more of the first substring, the second substring, and the third substring in a predetermined order to produce the private identifier; and any combination thereof. The second subset may be different from the first subset, and the second private entry element may be different from the one private entry element. The same regularization rule may be used to produce the cryptosets for all private datasets to be compared. The public identifier may be chosen from a hash value, a hash code, a hash sum, a check sum, a hash, a molecule ID, a scaffold group, a scaffold tree, a scaffold network, an R-group, and a nearest neighbor network. The degenerate mapping rule may be chosen from: a secure hash algorithm chosen from GOST, NAVAL, MD2, MD4, MD5, PANAMA, RadioGatun, RIPEMD, RIPEMD-128, RIPEMD-256, RIPEMD-160, RIPEMD-320, SHA-0, SHA-256, SHA-224, SHA-512, SHA-384, SHA-3, Tiger(2)-192, Tiger(2)-160, Tiger(2)- and 128, WHIRLPOOL; a scaffold tree algorithm that may include a single set of predefined scaffold decomposition rules; a scaffold network algorithm comprising a plurality of scaffold decomposition rules; and a molecule similarity rule that may include calculating a Tanimoto Coefficient. The cryptoset may include from about 500 to about 10,000 elements. The remote computing device may include at least one of a personal computer, a laptop computer, and a stand-alone training device. The private dataset and the second private dataset may be a type of dataset chosen from: a patient record database, a small-molecule screening database, a student record database, a test question database, a census database, and a chemical molecule database.

In another additional aspect, a system for generating an encrypted representation of a private dataset for comparison with a second encrypted representation of a second private dataset to determine the overlap between the private dataset and the second private dataset in a secure manner is provided. The system may include: at least one processor; at least one data storage system; and an application executed by the at least one processor. The application may be executed by the at least one processor to: receive an encryption request at at least one processing system; regularize each private entry element set to produce a plurality of private identifiers using a regularization rule; convert each private identifier to one of a plurality of public identifiers using a degenerate mapping rule to produce a list of public identifiers corresponding to the plurality of private identifiers; produce a cryptoset that may include a plurality of elements; and transmit the cryptoset to a remote computing device. The encryption request may include a plurality of private entries, and each of the private entries may include one or more private entry elements corresponding to an individual item of the private dataset. Each of the plurality of private identifiers may include an alphanumeric string. One or more of the plurality of private identifiers may be mapped to each public identifier of the plurality of public identifiers with a standard format. Each element may include one public identifier and a total number of repeated occurrences of the one public identifier among the plurality of public identifiers. Each private entry element may be chosen from at least one of: a personal name, an address, a birth date, a gender, an identifying number, an account number, a medical data entry, a grade, a test score, a credit record, an account balance, a chemical structure, and a name of a chemical molecule. The standard format of the personal identifier is an alphanumeric string that may include one or more concatenated substrings. Each of the substrings may include at least a portion of one private entry element from the private entry. The regularization rule may be chosen from: assigning a first subset of one private entry element to the private identifier; assigning the first subset of the one private entry element to a first substring; assigning a second subset of the one private entry element to a second substring; assigning a third subset of a second private entry element to a third substring; concatenating one or more of the first substring, the second substring, and the third substring in a predetermined order to produce the private identifier; and any combination thereof. The second subset may be different from the first subset, and the second private entry element may be different from the one private entry element. The same regularization rule may be used to produce the cryptosets for all private datasets to be compared. The public identifier may be chosen from a hash value, a hash code, a hash sum, a check sum, a hash, a molecule ID, a scaffold group, a scaffold tree, a scaffold network, an R-group, and a nearest neighbor network. The degenerate mapping rule may be chosen from: a secure hash algorithm chosen from GOST, NAVAL, MD2, MD4, MD5, PANAMA, RadioGatun, RIPEMD, RIPEMD-128, RIPEMD-256, RIPEMD-160, RIPEMD-320, SHA-0, SHA-256, SHA-224, SHA-512, SHA-384, SHA-3, Tiger(2)-192, Tiger(2)-160, Tiger(2)-128, and WHIRLPOOL; a scaffold tree algorithm that may include a single set of predefined scaffold decomposition rules; a scaffold network algorithm that may include a plurality of scaffold decomposition rules; and a molecule similarity rule that may include calculating a Tanimoto Coefficient. The cryptoset may include from about 50 to about 10,000 elements. The remote computing device may include at least one of a personal computer, a laptop computer, and a stand-alone training device. The private dataset and the second private dataset may be a type of dataset chosen from: a patient record database, a small-molecule screening database, a student record database, a test question database, a census database, and a chemical molecule database.

In yet another additional aspect, a system for generating an encrypted representation of a private dataset for comparison with a second encrypted representation of a second private dataset to determine the overlap between the private dataset and the second private dataset in a secure manner is provided. The system may include: at least one processor; at least one data storage system that may include modules executable by the at least one processor. The modules may include: a cryptoset generation module to receive an encryption request that may include a plurality of private entries and transmit the cryptoset to a remote computing device; a regularization module to regularize each private entry element set to produce a plurality of private identifiers using a regularization rule; an encryption module to convert each private identifier to one of a plurality of public identifiers using a degenerate mapping rule to produce a list of public identifiers corresponding to the plurality of private identifiers; and a cryptoset assembly module to produce a cryptoset that may include a plurality of elements. Each of the private entries may include one or more private entry elements corresponding to an individual item of the private dataset. Each of the plurality of private identifiers may include an alphanumeric string with a standard format. One or more of the plurality of private identifiers may be mapped to each public identifier of the plurality of public identifiers. Each element may include one public identifier and a total number of repeated occurrences of the one public identifier among the plurality of public identifiers. Each private entry element may be chosen from at least one of: a personal name, an address, a birth date, a gender, an identifying number, an account number, a medical data entry, a grade, a test score, a credit record, an account balance, a chemical structure, and a name of a chemical molecule. The standard format of the private identifier may include an alphanumeric string that includes one or more concatenated substrings, and each of the substrings may include at least a portion of one private entry element from the private entry. The regularization rule may be chosen from: assigning the first subset of the one private entry element to a first substring; assigning a second subset of the one private entry element to a second substring; assigning a third subset of a second private entry element to a third substring; concatenating one or more of the first substring, the second substring, and the third substring in a predetermined order to produce the private identifier; and any combination thereof. The second subset may be different from the first subset and the second private identifier may be different from the one private identifier. The same regularization rule may be used to produce the cryptosets for all private datasets to be compared. The public identifier may be chosen from a hash value, a hash code, a hash sum, a check sum, a hash, a molecule ID, a scaffold group, a scaffold tree, a scaffold network, an R-group, and a nearest neighbor network. The degenerate mapping rule may be chosen from: a secure hash algorithm chosen from GOST, NAVAL, MD2, MD4, MD5, PANAMA, RadioGatun, RIPEMD, RIPEMD-128, RIPEMD-256, RIPEMD-160, RIPEMD-320, SHA-0, SHA-256, SHA-224, SHA-512, SHA-384, SHA-3, Tiger(2)-192, Tiger(2)-160, Tiger(2)-128, and WHIRLPOOL; a scaffold tree algorithm that may include a single set of predefined scaffold decomposition rules; a scaffold network algorithm that may include a plurality of scaffold decomposition rules; and a molecule similarity rule that may include calculating a Tanimoto Coefficient. The cryptoset may include from about 50 to about 10,000 elements. The remote computing device may include at least one of a personal computer, a laptop computer, and a stand-alone training device. The private dataset and the second private dataset are a type of dataset chosen from: a patient record database, a small-molecule screening database, a student record database, a test question database, a census database, and a chemical molecule database.

In another aspect, a method for estimating the overlap between two or more comparison private datasets comprising a first private dataset and a second private dataset in a secure manner is provided. The method may include generating a cryptoset for each of the two or more comparison private datasets; estimating the overlap between the comparison private datasets by applying an overlap rule to the first cryptoset and the second cryptoset; and transmitting the estimated overlap between the comparison private datasets to a remote computing device. A first cryptoset may include an encrypted representation of the first private dataset and a second cryptoset may include an encrypted representation of the second private dataset. Each cryptoset may be generated by: receiving an encryption request at at least one processing system; regularizing each private entry elements set to produce a plurality of private identifiers using a regularization rule; converting each private identifier to one of a plurality of public identifiers using a degenerate mapping rule to produce a list of public identifiers corresponding to the plurality of private identifiers; producing a cryptoset comprising a plurality of elements; and transmitting each cryptoset to a remote computing device. The encryption request may include a plurality of private entries and each of the private entries may include one or more private entry elements corresponding to an individual item of one of the comparison private datasets. Each of the plurality of private identifiers may include an alphanumeric string with a standard format and one or more of the plurality of private identifiers may be mapped to each public identifier of the plurality of public identifiers. Each element may include one public identifier and a total number of repeated occurrences of the one public identifier among the plurality of public identifiers.

The overlap rule may include:

$$A \cap B = \sum A_i B_i - \frac{\sum A_i \sum B_i}{L} \qquad \text{Eqn. (I)}$$

in which: $A \cap B$ is an estimated number of individual entries in common between the first private dataset and the second private dataset; $A_i$ is the total number of repeated occurrences of the $i^{th}$ public identifier in the first cryptoset; $B_i$ is the total number of repeated occurrences of the $i^{th}$ public identifier in the second cryptoset; and L is the number of public identifiers in the first cryptoset and the second cryptoset.

The overlap rule may include:

$$A \cap B = R_{AB} \sqrt{\sum A_i \sum B_i} \qquad \text{Eqn. (II)}$$

in which: $A \cap B$ is an estimated number of individual entries in common between the first private dataset and the second private dataset; $R_{AB}$ is the unscaled Pearson correlation function; $A_i$ is the total number of repeated occurrences of the $i^{th}$ public identifier in the first cryptoset; and $B_i$ is the total number of repeated occurrences of the $i^{th}$ public identifier in the second cryptoset.

The overlap rule may include:

$$\frac{A \cap B}{\min[\sum A_i, \sum B_i]} = R_{AB} \sqrt{\eta} \qquad \text{Eqn. (III)}$$

wherein: $A \cap B$ is an estimated number of individual entries in common between the first private dataset and the second private dataset; $A_i$ is the total number of repeated occurrences of the $i^{th}$ public identifier in the first cryptoset; $B_i$ is the total number of repeated occurrences of the $i^{th}$ public identifier in the second cryptoset; $R_{AB}$ is the unscaled Pearson correlation function; and $$\eta = \frac{\max[\sum A_i, \sum B_i]}{\min[\sum A_i, \sum B_i]}.$$

BRIEF DESCRIPTION OF THE DRAWINGS

The following figures illustrate various aspects of the disclosure.

FIGS. 5A, 5B, and 5C are histograms summarizing entries in a private dataset: surname (FIG. 5A), age (FIG. 5B), and birthdate (FIG. 5C). FIG. 5D is a cryptoset derived from the private dataset. FIG. 5E is a Venn diagram summarizing the overlap between datasets A, B, and C. FIG. 5H is a Venn diagram summarizing the estimated overlap between datasets A, B, and C using the corresponding cryptosets.

FIG. 6A is a summary of the information content of cryptoset entries for a cryptoset length of 500. FIG. 6B is a summary of the information content of cryptoset entries for a cryptoset length of 1000. FIG. 6C is a summary of the information content of cryptoset entries for a cryptoset length of 2000.

FIG. 7A is a Venn diagram of the actual overlap of datasets A and B. FIG. 7B is the distribution across cryptosets. FIG. 7C shows that for a single public identifier, there may be the same and different molecules in each dataset. FIGS. 7D and 7E show the correlation of the cryptosets and a Venn diagram of the estimated overlap of the datasets, respectively.

FIG. 8A is an illustration of molecule identifiers. FIG. 8B is an illustration of nearest neighbors. FIG. 8C is an illustration of scaffold groups. FIG. 8D is an illustration of a scaffold tree. FIG. 8E is an illustration of a scaffold network. FIG. 8F is an illustration of an R-group scaffold network.

Corresponding reference characters and labels indicate corresponding elements among the views of the drawings. The headings used in the figures should not be interpreted to limit the scope of the claims.

DETAILED DESCRIPTION

Provided herein are methods and systems for generating an encrypted representation of a private dataset for comparison with a second encrypted representation of a second private dataset to determine the overlap between the private dataset and the second private dataset. This method of estimating dataset overlap allows the data needed for comparison to be exchanged publicly without jeopardizing privacy.

The method may construct a private dataset's summary, called its "cryptoset" that is publicly sharable. The overlap between two private datasets may be estimated by comparing the cryptosets. At the same time, it may not be possible to determine which specific items are in a private dataset from an analysis of its cryptoset. Unlike previous methods of dataset encryption, item-level security arises from statistical properties of cryptosets rather than the secrecy of the algorithm or computation difficulty, so cryptosets may be shared in public, untrusted environments.

Cryptosets are informative, stable, secure, and may be shared publically. The method of generating a cryptoset creates regularized private identifiers for all entries in a dataset and then converts these private identifiers into a shareable histogram of a small number of public identifiers, a cryptoset. Overlaps between private datasets may be estimated from their cryptosets. These estimates may be informative but may also have a predetermined amount of noise. The cryptosets may be secure because there is a many-to-one relationship between all private and public identifiers.

Figure 5:
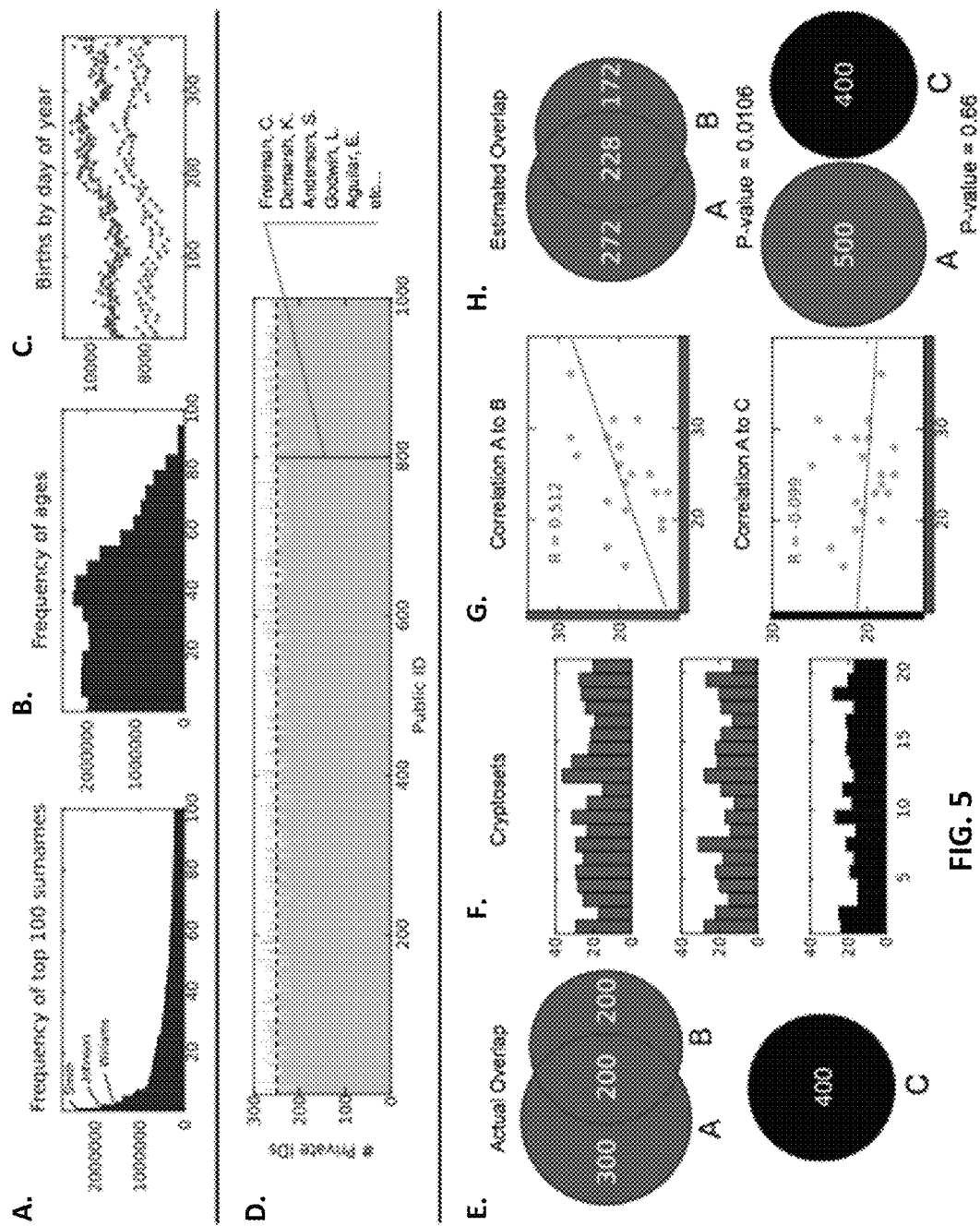
FIGS. 5A, 5B, 5C, 5D, 5E, and 5H illustrate how the cryptoset may distribute patterned private identifiers relatively uniformly across the public identifiers and then be used to estimate the overlap between datasets.
FIG. 5F are cryptosets corresponding to datasets A, B, and C.
FIG. 5G are correlations of cryptosets A and B and cryptosets A and C used to estimate overlap.
Figure 6:
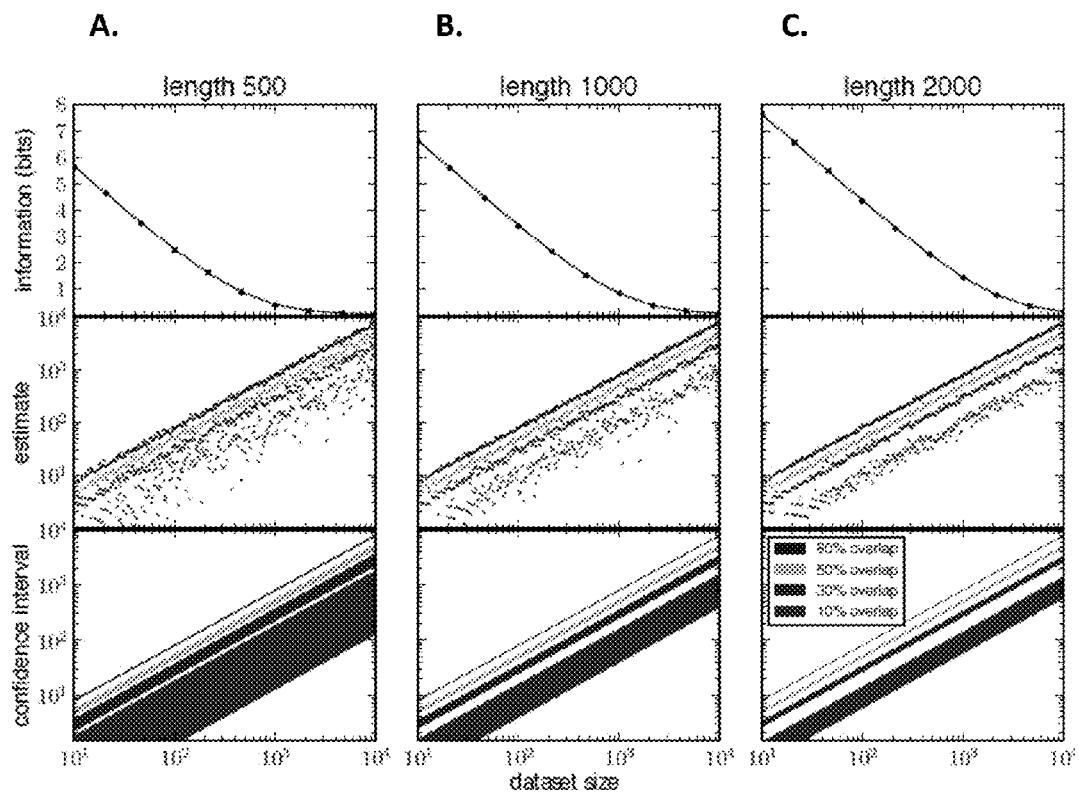
FIGS. 6A, 6B, and 6C illustrate how cryptosets become more secure as datasets grow and accuracy is tunable by cryptoset length and insensitive to dataset size.

Cryptosets become more secure as more items are added to the private dataset and the length of the cryptoset increases, as illustrated in FIG. 6 and further described herein below. FIGS. 5A, 5B, 5C, and 5D demonstrate how a degenerate mapping rule, a cryptographic hash in this aspect, may distribute private identifiers evenly across public identifiers. The more items in the cryptoset, the closer the cryptoset may be to a uniform distribution and the less informative the cryptoset may be about specific public identifiers. Moreover, the amount of information a specific cryptoset carries may be quantified and used to determine the risk in releasing the cryptoset. Information may include how much memory is used to store the respective data. Without being limited to any particular theory, the lower the information in a public cryptoset, the more difficult it may be to determine the private data. As the number of items increases, cryptoset security rapidly approaches "information-theoretic" security, the strongest type of security possible in cryptography, which may not be crackable with infinite computing power. This property may make cryptosets very resistant to attack.

For the sharing of chemical information, the relationships between molecules, instead of descriptors of their structures, may be shared as a chemical cryptoset. Assay data may be shared alongside different anonymized molecule representations as a chemical cryptoset. The sharing of chemical cryptosets may enable collaborative analysis of high throughput screening data.

Cryptosets and chemical cryptosets may be resistant to attack without relying on secret keys or algorithms. At the same time, cryptosets and chemical cryptosets may be informative about overlaps between private datasets with a stable, tunable accuracy.

I. Methods for Generating an Encrypted Dataset

In various aspects, a method to generate an encrypted dataset for comparison to other encrypted datasets is provided. Any alphanumeric element contained within a private dataset may be used in the encryption from a private dataset to a public cryptoset.

Figure 1:
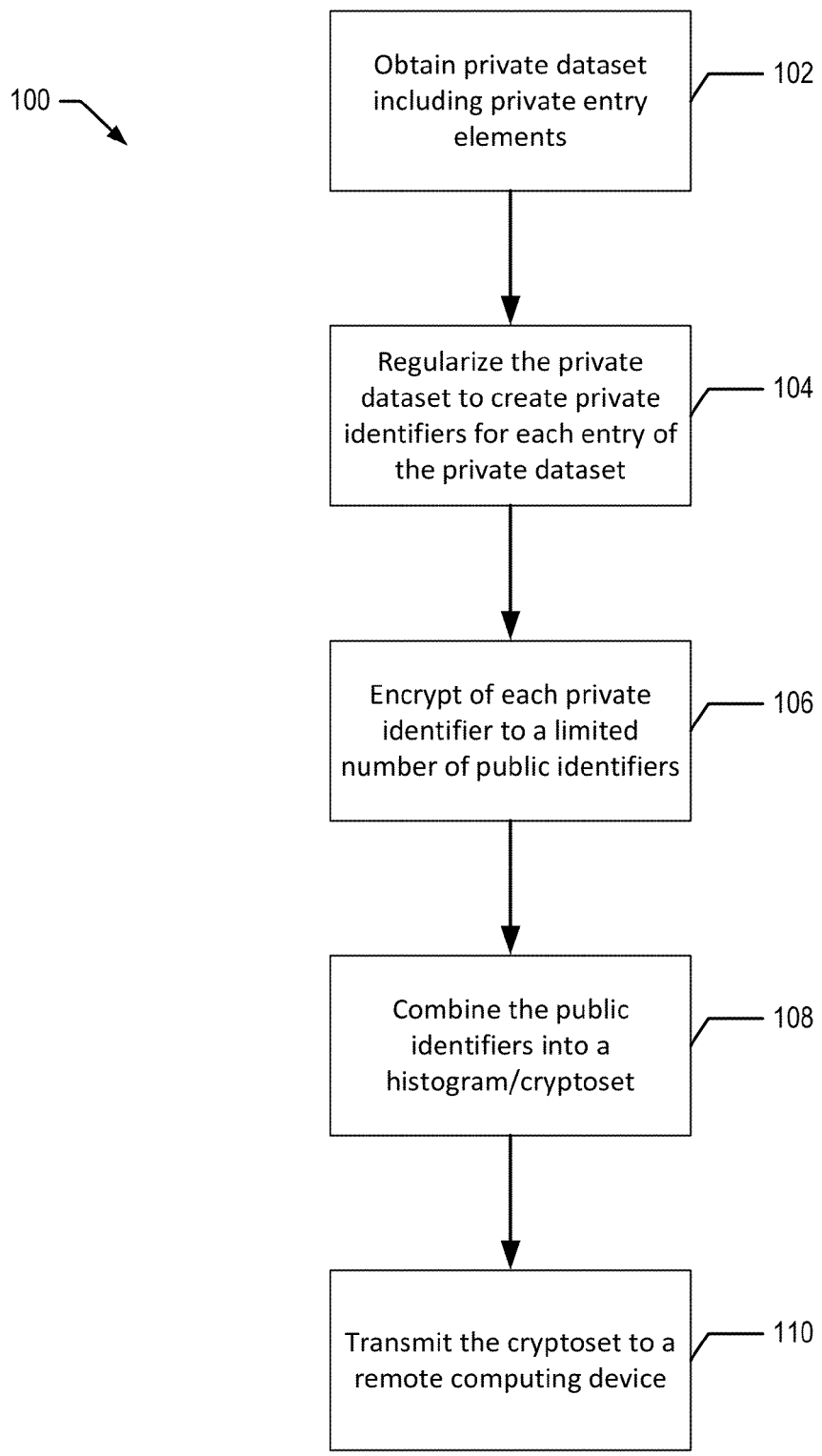
FIG. 1 is a block diagram of a method for generating a cryptoset from an entry of a private dataset in one aspect.

FIG. 1 is a block diagram of a method for generating an encrypted dataset, or cryptoset, from an entry of a private dataset 100 in one aspect. The method for generating the cryptoset 100 may include obtaining a private dataset which includes private entries with private entry elements 102. The private entry elements may then be regularized into private identifiers 104 for each entry of the private dataset. Using a degenerate mapping rule, each private identifier may be encrypted into a limited number of public identifiers 106. In an aspect, the degenerate mapping rule may be a hash function. The frequency of public identifiers may then be arranged into a histogram 108 by noting the frequency of private identifiers that map to each public identifier. The histogram is a public cryptoset which may be transmitted to a remote computing device 110 for sharing with others and/or comparing with other cryptosets.

In an aspect, the method may be available from a web accessible space. A generated cryptoset may be shared on a public web application and/or stored in a public database. Others may access the publicly shared cryptosets for comparison to other cryptosets.

A. Receive an Encryption Request

In various aspects, the method of generating a cryptoset may include receiving an encryption request for a private dataset at step 102 at at least one processing system. In an aspect, the method may include first receiving an encryption request and second accessing a private database to retrieve the private dataset to be encrypted.

The private dataset may include a plurality of private entries. Each private entry may include a plurality of private entry elements. Any private information may be considered a private entry element including, but not limited to a personal name, an address, a birthdate, a gender, an identifying number, an account number, medical entry data, a grade, a test score, a credit record, an account balance, a name of a chemical molecule, a genetic sequence, or any other alphanumeric information. In an aspect, the private entry element may also include a chemical structure or any other physical structure.

B. Regularize Private Dataset with Private IDs

In various aspects, the method of generating a cryptoset may include regularizing private entry elements within the private dataset to create private identifiers for each private entry at step 104. Each private entry may have a corresponding regularized private identifier. A private identifier may include an alphanumeric string in an aspect. The alphanumeric string may include at least one substring of at least a portion of one private entry element from the private entry. In an aspect, the private identifier may be of varying length. In one aspect, the private identifier for each private entry may be of fixed length. In another aspect, the alphanumeric string of the private identifier may include one or more concatenated substrings.

The private identifier may be regularized using a regularization rule. A regularization rule ensures that a set private entry yields the exact same string format for everyone. A non-limiting example of a regularization rule may include assigning the first subset of the one private entry element to a first substring; assigning a second subset of the one private entry element to a second substring, where the second subset is different from the first subset; assigning a third subset of a second private entry element to a third substring, where the second private entry element is different from the one private entry element; concatenating one or more of the first substring, the second substring, and the third substring in a predetermined order to produce the private identifier, and any combination thereof. For example, the private identifier may consist of a string of a first initial, last name, and date of birth, therefore creating a string of varying length for each private entry within the private dataset.

In an aspect, the same regularization rule is used on each private dataset to be compared. Regularization of the private identifiers within a private dataset and between datasets ensures that the private identifiers will map to the same public identifiers for comparison.

C. Encrypt Private Identifiers to Public Identifiers

The method of generating a cryptoset may include encrypting private identifiers to public identifiers. In various aspects, each private identifier may be encrypted to a one of a plurality of public identifiers at step 106 using a degenerate mapping rule. In an aspect, the number of public identifiers may be limited. The number of public identifiers, or length of the cryptoset, may typically range from about 50 to about 10,000 or more. The length of the cryptoset, in one aspect, may be selected to provide sufficiently secure encryption while retaining sufficient informational content to provide a sufficiently accurate estimate of overlap with other cryptosets. In various aspects, the number of public identifiers may range from about 50 to about 150, from about 100 to about 500, from about 300 to about 1000, from about 500 to about 1,500, from about 1,000 to about 5,000, from about 3,000 to about 8,000, and from about 5,000 to about 10,000. The number of public identifiers may be about 1000 in one aspect.

Figure 4:
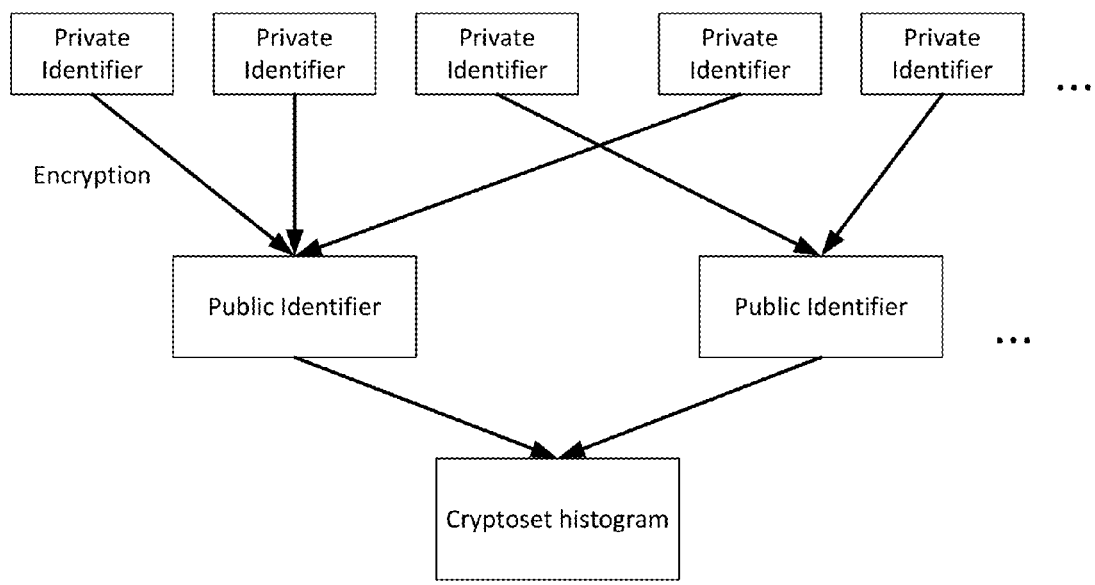
FIG. 4 is a block diagram illustrating the many-to-one concept in which multiple private identifiers relate to the same public identifier.

Degenerate mapping corresponds to having every public identifier map to many private identifiers. The security of the cryptoset relies on this many-to-one correlation between private identifiers and public identifiers, and the cryptosets may remain secure as long as this relationship holds. FIG. 4 illustrates the many-to-one concept in which multiple private identifiers relate to the same public identifier. For example, every public identifier may map to hundreds or thousands of possible private identifiers. Enumerating the private identifiers associated with a specific public identifier may be difficult, and there may be no way to tell which ones correspond with those from the private dataset.

Cryptosets are secure, but remain informative about dataset overlap. FIGS. 6A, 6B, and 6C illustrate how cryptosets become more secure as datasets and cryptoset lengths increase in size, and the accuracy of the estimates may be tuned by the length of the cryptosets while relative error is stable across all dataset sizes. FIG. 6A corresponds to a cryptoset length of 500, FIG. 6B corresponds to a cryptoset length of 1000, and FIG. 6C corresponds to a cryptoset length of 2000. In FIGS. 6A, 6B, and 6C, the first row illustrates that the information given away about specific public identifiers approaches zero as the dataset size increases. The second row demonstrates that the accuracy of estimates increases with cryptoset length while the relative error is stable across all dataset sizes using empirical estimates. The third row illustrates that analytically derived 95% confidence intervals closely match the empirical estimates.

The accuracy of the estimates is related to the length of the cryptosets and the ratio between the number of entries in each dataset. The larger the ratio, the less accurate the estimate; the longer the cryptoset, the more accurate. For example, cryptosets that are 1000 public identifiers long may measure the overlap between equal-size sets to an accuracy of about 5%, enough accuracy to be informative in most use cases.

The plurality of private identifiers for a private dataset may be converted to a plurality of public identifiers using a degenerate mapping rule. The privacy of the private identifiers is not compromised by the mapping rule used to generate the public identifiers. The degenerate mapping rule may result in a list of public identifiers corresponding to the plurality of private identifiers, where one or more private identifiers are mapped to each public identifier.

Non-limiting examples of the degenerate mapping rule may include a secure hash algorithm, a scaffold tree algorithm including a single set of predefined scaffold decomposition rules, a scaffold network algorithm including a plurality of scaffold decomposition rules, and a molecule similarity rule including calculating a Tanimoto Coefficient. Non-limiting examples of a secure hash algorithm may include GOST, NAVAL, MD2, MD4, MD5, PANAMA, RadioGatun, RIPEMD, RIPEMD-128, RIPEMD-256, RIPEMD-160, RIPEMD-320, SHA-0, SHA-256, SHA-224, SHA-512, SHA-384, SHA-3, Tiger(2)-192, Tiger(2)-160, Tiger(2)-128, and WHIRLPOOL.

For example, for each private identifier string s, the public identifier may be determined by computing the hash and then modulus it by the length, or $H(s) \pmod{L}$. In an aspect, the private identifiers may be mapped uniformly to a large integer, output space representing the public identifiers. The plurality of public identifiers may be, but is not limited to a hash value, a hash code, a hash sum, or a hash.

D. Combine Public IDs into a Histogram/Cryptoset

Referring back to FIG. 1, the method of creating a cryptoset may include combining the generated plurality public identifiers from the private identifiers into a public cryptoset at step 108. The cryptoset may include a plurality of bins, where each bin relates to one public identifier and each bin is associated with an integer encoding a total number of repeated occurrences of the public identifier among the plurality of public identifiers.

The number of times each of the public identifiers appears in the set may be stored in each bin. This list of all integers in all bins, corresponding to a histogram of public identifiers comprises the cryptoset. The cryptoset may be stored as a vector indexed by public identifier from 0 to $L-1$, denoted as $(X_i)_0^{L-1}$, where X is the integer value for the $i^{th}$ bin corresponding to the total number of private identifiers mapped to the $i^{th}$ public identifier by the degenerate mapping rule, and L is the total number of bins corresponding to the total number of public identifiers.

FIGS. 5A, 5B, 5C, 5D, and 5F illustrate how the cryptoset may distribute patterned private identifiers relatively uniformly across the public identifiers, using the many-to-one concept described herein above. The cryptosets may then be used to estimate the overlap between datasets. Patterned private data is illustrated in the frequency of the top 100 last names in FIG. 5A, the frequency of ages in FIG. 5B, and the cyclical birth dates in FIG. 5C from census data. Using a degenerate mapping rule, the private information is mapped to public identifiers to develop a relatively uniform cryptoset in FIG. 5D. The cryptoset may be visualized as a histogram, as seen in FIGS. 5D and 5F.

E. Transmit Cryptoset

Referring back to FIG. 1, the method of generating a cryptoset may include transmitting the compiled cryptoset to a remote computing device at step 110. In an aspect, the remote computing device may include, but is not limited to a personal computer, a laptop computer, a stand-alone training device, and any combination thereof. The transmission to a remote computing device may allow for the sharing of the cryptoset for comparison to other cryptosets using the same regularization rule and degenerate mapping rule.

II. Methods for Estimating Overlap Between Datasets

Figure 2:
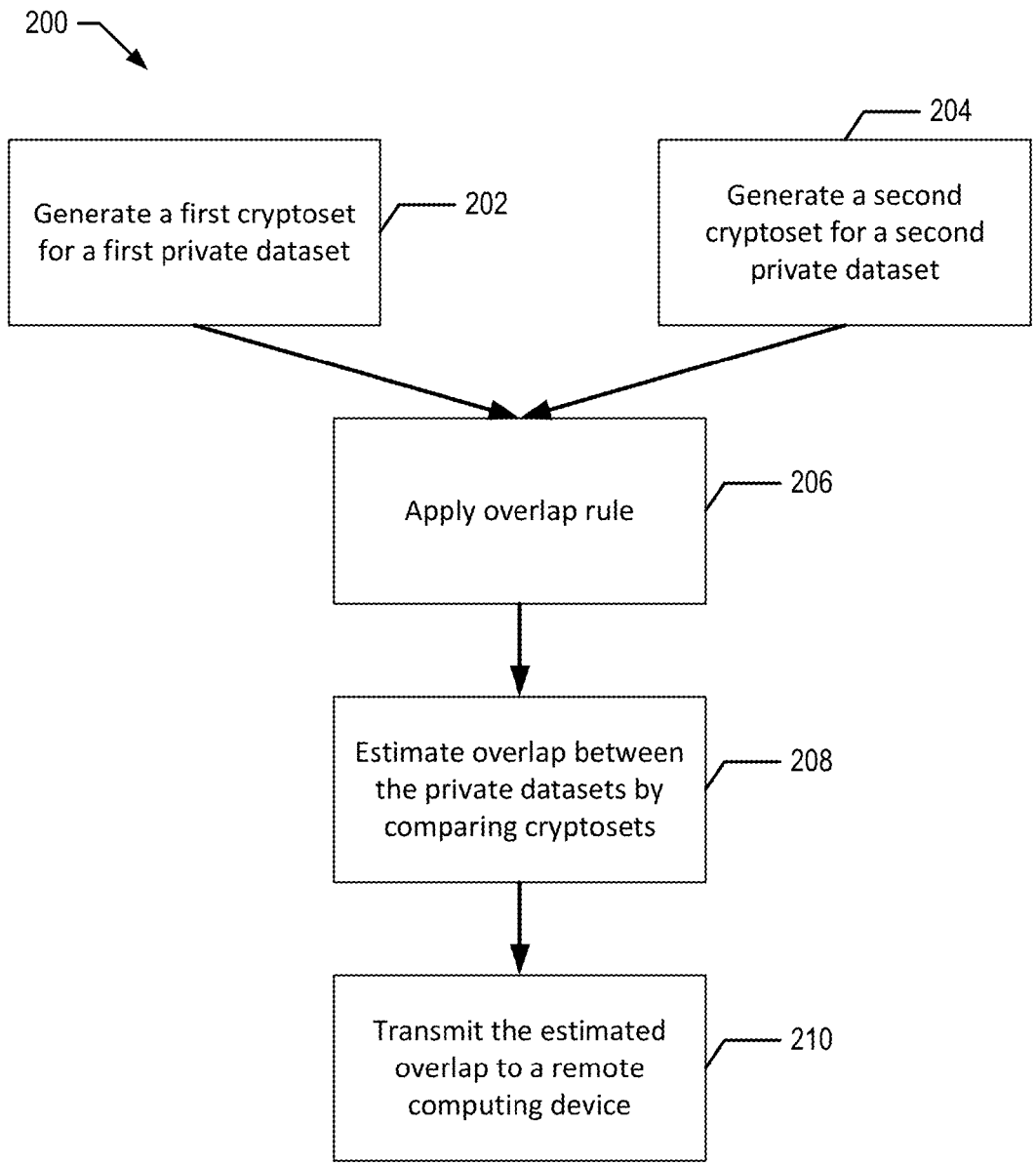
FIG. 2 is a block diagram of a method for estimating the overlap between private datasets.

A method 200 for estimating the overlap between private datasets, illustrated as a block diagram in FIG. 2. As illustrated in FIG. 2, the method 200 may include generating at least two cryptosets from at least two private datasets at steps 202 and 204, applying an overlap rule to the first cryptoset and the second cryptoset at step 206, estimating the overlap between the datasets at step 208, and transmitting the estimated overlap between the datasets at step 210.

Without being limited to any particular theory, a well-studied statistical framework underlies the methods of overlap estimation used at step 208. In one aspect, the cryptoset comparison at step 208 is closely related to the Pearson correlation. Significance values, power estimates, confidence intervals and credible intervals may be estimated using methods known in the art. Cryptosets provide unbiased estimates of the overlap between private datasets, with accuracy tunable by varying the cryptoset length. The accuracy of the overlap estimates is stable. Cryptosets compute overlap at a predetermined resolution, no matter how many items are added or removed from them.

A. Generate at Least Two Cryptosets

The method 200 for estimating the overlap between datasets may include generating at least two cryptosets for comparison at steps 202 and 204. In various aspects, the method may include creating a first cryptoset including an encrypted representation of a first private dataset at step 202 and a second cryptoset including an encrypted representation of a second private dataset at step 204. The cryptosets may be generated using any of the methods described herein above. Generally these methods may include receiving an encryption request with a private dataset of private entry elements, using the private entry elements to regularize each private identifier for each private entry, encrypting each private identifier into a public identifier, and producing a cryptoset from the plurality of public identifiers.

Each cryptoset should be generated using the same regularization rule and same degenerate mapping rule to be compatible for comparison. The regularization rule and degenerate mapping rule may be shared publically to ensure that the same rule is applied to datasets that will be compared.

B. Estimate the Overlap

The method 200 may include applying an overlap rule at step 206 to at least two cryptosets and estimating the overlap between two datasets by comparing their cryptosets at step 208. Two datasets, a first dataset and a second dataset, may use the same regularization rule, mapping rule, and cryptoset length to generate a first cryptoset and second cryptoset. The first cryptoset and the second cryptoset may be compared for estimation of the overlap of their respective private datasets. In an aspect, the overlap may be estimated using the Pearson correlation.

The method 200 for estimating the overlap between two datasets may include applying an overlap rule utilizing both the first cryptoset and the second cryptoset. In various aspects, the overlap between the datasets may be estimated by application of an overlap rule. The overlap rule may use information within the cryptosets to estimate the number of private dataset entries the two cryptosets may have in common.

In one aspect, the overlap between datasets may be estimated based on the Pearson correlation between cryptosets, and the overlap may be measured at a predetermined resolution.

In an aspect, Eqn. (I) may be used as the overlap rule for a first cryptoset, A, and a second cryptoset, B:

$$A \cap B = \sum A_i B_i - \frac{\sum A_i \sum B_i}{L} \quad \text{Eqn. (I)}$$

In this aspect, A∩B is an estimated number of individual entries in common between the first private dataset and the second private dataset. $A_i$ is the total number of repeated occurrences of the $i^{th}$ public identifier in the first cryptoset. $B_i$ is the total number of repeated occurrences of the $i^{th}$ public identifier in the second cryptoset. L is the number of public identifiers in both the first cryptoset and the second cryptoset.

In another aspect, the overlap rule may be represented by Eqn. (II):

$$A \cap B = R_{AB} \sqrt{\sum A_i \sum B_i} \quad \text{Eqn. (II)}$$

In this aspect, A∩B is an estimated number of individual entries in common between the first private dataset and the second private dataset. $R_{AB}$ is the unscaled Pearson correlation function. $A_i$ is the total number of repeated occurrences of the $i^{th}$ public identifier in the first cryptoset. $B_i$ is the total number of repeated occurrences of the $i^{th}$ public identifier in the second cryptoset.

The overlap rule may be represented by Eqn. (III) in another aspect:

$$\frac{A \cap B}{\min[\sum A_i, \sum B_i]} = R_{AB} \sqrt{\eta} \quad \text{Eqn. (III)}$$

In this aspect, A∩B is an estimated number of individual entries in common between the first private dataset and the second private dataset. $A_i$ is the total number of repeated occurrences of the $i^{th}$ public identifier in the first cryptoset. $B_i$ is the total number of repeated occurrences of the $i^{th}$ public identifier in the second cryptoset. $R_{AB}$ is the unscaled Pearson correlation function, and $$\eta = \frac{\max[\sum A_i, \sum B_i]}{\min[\sum A_i, \sum B_i]}.$$

As discussed herein above, as the number of items in each cryptoset increase, cryptosets have two desirable features. First cryptosets become more secure. More public identifier repetitions occur, and the number of empty elements in the cryptosets goes to zero. These trends may make the cryptoset less and less informative in determining the membership of specific items in the set. As the first and second cryptosets increase in total number of members, it may become more difficult to detect small overlaps. This is the exact opposite behavior of sharing full cryptographic hashes or bloom filters of private identifiers, which become less secure and easier to crack as datasets A and B increase.

Second, the accuracy of estimates of overlap between the two cryptosets may be stable independent of the size of the databases. The estimate of the proportion of the overlap improves as the number of items in the cryptosets remains at a stable accuracy. "Stable accuracy" as defined herein, refers to a property of a cryptoset characterized by an accuracy of the cryptosets of a given length that is independent of the size of datasets. By way of non-limiting example, cryptosets of a specific length L may have 3% error on datasets of all sizes, from small datasets of 100 items, to large datasets with thousands or hundreds of thousands of items. The stable accuracy of the cryptosets results due to the accuracy of the estimate decreasing exactly as fast as the number items increases. In an aspect, the confidence interval for the proportion of overlap between cryptosets A and B may be estimated by Eqn. (IV):

$$\frac{A \cap B}{\sqrt{AB}} \in R_{AB} \pm \frac{\phi^{-1}(1/2 + \gamma/2)}{\sqrt{L}} \qquad \text{Eqn. (IV)}$$

In this aspect, $A \cap B$ is an estimated number of individual entries in common between the first private dataset and the second private dataset. $R_{AB}$ is the unscaled Pearson correlation function. L is the total combined number of public identifiers in the first cryptoset and the second cryptoset. $\phi(\cdot)$ is the cumulative distribution function of a standard normal distribution. $\gamma$ is the confidence of the lower and upper bounds of the interval.

As the difference between the number of items in each cryptoset increases, then the accuracy of the estimate of overlap relative to the smaller cryptoset decreases. Without being limited to any particular theory, the smaller a first cryptoset is in comparison to the second cryptoset, the more difficult it may become to determine if an element from the smaller cryptoset is likely to be within the larger cryptoset.

In an aspect, the tradeoff between estimation error and security is tunable by changing the length of the cryptoset, L. For example, L may be increased when very accurate estimate of overlap of large datasets with smaller datasets are important. In this case, L may be tuned to ensure the standard error is much less than the error relative to the smaller set. Even increasing L to values as high 10,000 still maps large numbers of private identifiers to the same public identifier, maintaining the noninformative degeneracy of the data structure.

Decreasing L values may be important when only small sets must be compared and there is strong prior information about which items are available for inclusion in the sets. If there are only a few thousand possible items to choose from, L may be reduced to ensure that there are always a high degeneracy in the public identifiers. For example, to securely share sets of 20,000 human genes, an L=100 may be appropriate, making a 200 to 1 mapping between private and public identifiers.

C. Transmit the Estimated Overlap

The method 200 for estimating the overlap between datasets may include transmitting the estimated overlap to a remote computing device at step 210. In an aspect, the transmitted estimated overlap may be reported to the owners of the separate compared cryptosets. In another aspect, the estimated overlap may be made public.

Based on the estimate of overlap between the datasets, the owners of the datasets may choose, or not, to move forward with negotiating the legal, institutional, and/or ethical barriers associated with the sharing of private databases.

III. Systems for Generating an Encrypted Dataset and Estimating Overlap

Figure 3:
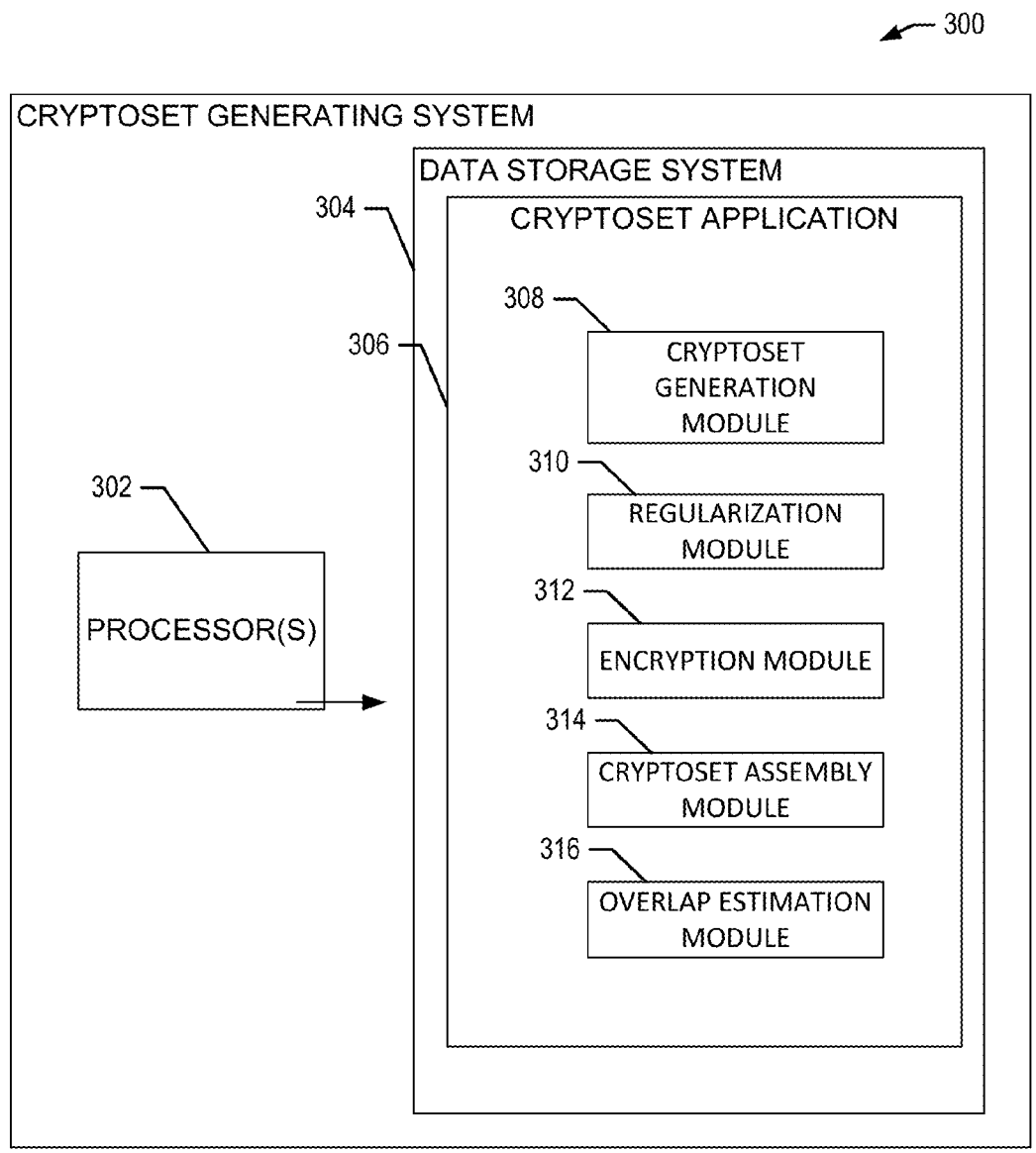
FIG. 3 is a diagram illustrating the elements of a system for generating a cryptoset of a private dataset for comparison with a second cryptoset of a second private dataset to determine the overlap between the two datasets.

FIG. 3 is a system diagram illustrating the elements of a system 300 for generating an encrypted representation of a private dataset for comparison with a second encrypted representation of a second private dataset to determine the overlap between the two datasets. The system 300 may include at least one processor 302 and at least one data storage system 304. The data storage system may include a cryptoset application 306 configured to execute on the at least one processor 302. The cryptoset application 306 may include a cryptoset generation module 308, a regularization module 310, an encryption module 312, and a cryptoset assembly model 314. In an aspect, the system 300 may further include an overlap estimation module 316.

The system 300 may retrieve an input of at least one private dataset containing private entries, create regularized private identifiers for each entry, encrypt the private identifiers into public identifiers, assemble the public identifiers into a cryptoset, and optionally estimate the overlap between two or more cryptosets using the methods described previously herein.

A. Cryptoset Generation Module

In various aspects, the system may include a cryptoset generation module 308. The cryptoset generation module may receive an encryption request, transmit the cryptoset, or perform any other function relating to the input and output of the generation of a cryptoset. The encryption request may include a private dataset with a plurality of private data entries. Each private data entry may include one or more private entry elements. The data received by the cryptoset generation module may be used as the input for the regularization module. In an aspect, the cryptoset generation module may receive more than one encryption request, corresponding to more than one private dataset simultaneously.

Once the cryptoset has been generated, or at any other point in the process, the cryptoset generation module 308 may transmit the cryptoset to a remote computing device. In an aspect, the transmitted cryptoset may then be shared publically with others.

B. Regularization Module

The regularization module 310 may receive the private dataset information from the cryptoset generation module 308. In this module 310, a regularization rule may be applied to the private dataset. Regularization may transform private entry elements into regularized private identifiers, using the methods described herein above. In an aspect, the private identifiers may be composed of an alphanumeric string with a standard format.

The plurality of private identifiers generated by the regularization module 310, may be used as an input into the encryption module 312.

C. Encryption Module

The encryption module 312 may apply a degenerate mapping rule, using the methods described herein above. The degenerate mapping rule may convert each private identifier to one of a plurality of public identifiers.

Resulting public identifiers may be assembled into a cryptoset through the cryptoset assembly module. The public identifiers may be provided in a format that is secure and sharable. In an aspect, one or more of the plurality of private identifiers may be mapped to each public identifier of the plurality of public identifiers. The security of the public identifiers and resulting cryptosets depend on the many-to-one relationship between the private identifiers and public identifiers.

D. Cryptoset Assembly Module

The cryptoset assembly module 314 may produce a cryptoset composed of a plurality of elements. Each element is associated with one public identifier and includes the total number of repeated occurrences of the one public identifier among the plurality of public identifiers for that specific private dataset.

The length of the cryptoset may be influenced by the number of public identifiers for the private dataset to be encrypted and shared. The security of the cryptoset and the accuracy of calculating overlap between cryptosets may be tuned by adjusting the length of the cryptoset, as discussed herein above.

Cryptosets may then be transmitted to a remote computing device for storing, sharing, or transferring to others. A cryptoset may also be used to compare against another cryptoset to estimate the overlap between the corresponding private datasets.

E. Overlap Estimation Module

The overlap estimation module 316 may calculate an estimate of the proportion of overlap between two private datasets using their respective cryptosets. The overlap estimation module 316 may apply an overlap rule to the cryptosets. An estimation of the proportion of overlap between the private datasets may result from the application of the overlap rule. In an aspect the estimate of the overlap may be based on the Pearson correlation between the cryptosets and may measure overlap at a predetermined resolution.

Once the overlap between the datasets has been estimated, the information may be transmitted to a remote computing device by the cryptoset generation module.

IV. Methods for Sharing Chemical Information

Figure 14:
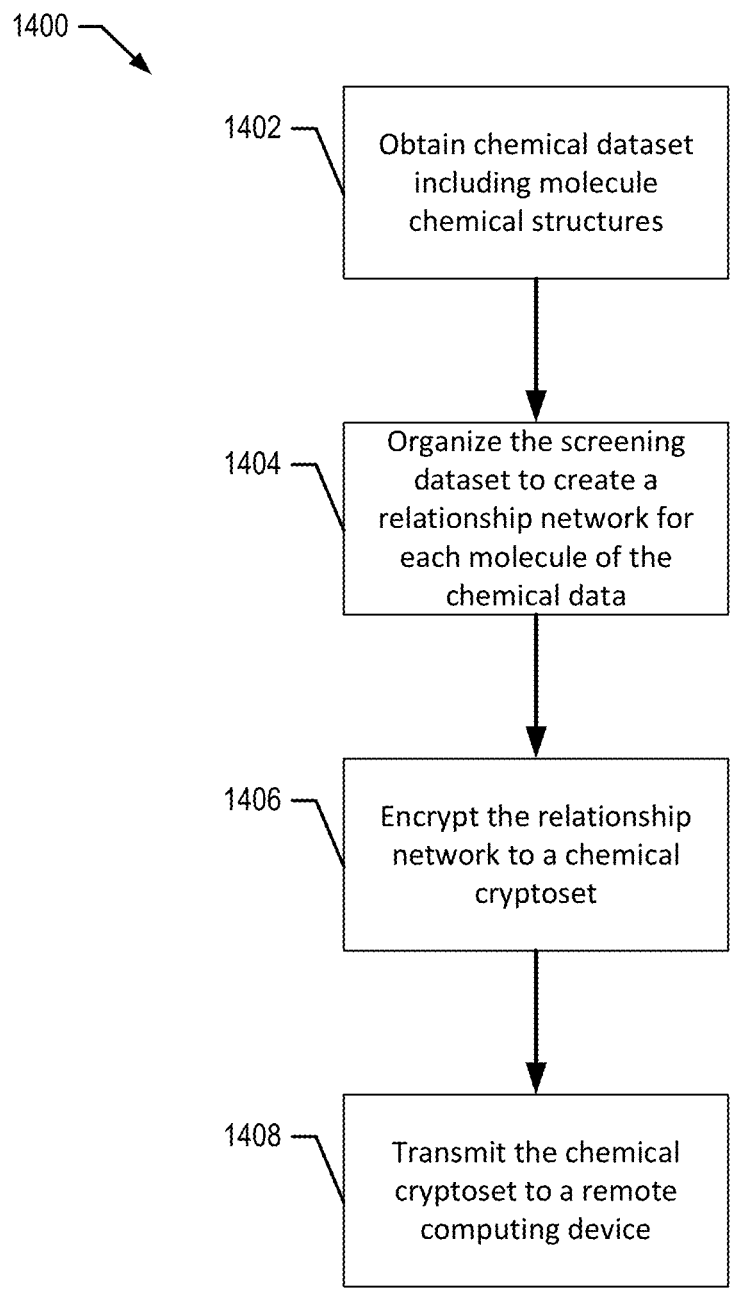
FIG. 14 is a flow chart summarizing a method for generating a chemical cryptoset from a private chemical dataset.

FIG. 14 is a block diagram of a method 1400 for generating a chemical cryptoset from a private chemical dataset in one aspect. In an aspect, a method 1400 of securely sharing information associated with a private chemical dataset including, but not limited to a screening library is provided. A private chemical dataset may include a plurality of private entries. Each private entry may specify an individual chemical molecular structure of the private chemical dataset. In one aspect, additional information may be associated with each private entry. Non-limiting examples of additional information associated with each private entry may include an assay result, an activity such as a chemical activity or a biological activity, or any other known measurement, quantity or classification of a physical, chemical, or biological property of each molecule.

The method 1400 may include receiving an encryption request and obtaining a private chemical dataset at step 1402, arranging molecules based on their relationships according to a predetermined relationship rule at step 1404, and creating a chemical cryptoset at step 1406 encoding the relationships of the molecules which may be shared publically without revealing the detailed chemical structures. The chemical cryptoset may then be transmitted to a remote computing device at step 1408. These chemical cryptosets may be compared to assess the degree of overlap between the molecules in two chemical datasets to inform decisions regarding sharing information within the private databases, for example.

In an aspect, an encryption request may include receiving the plurality of private entries from the private chemical dataset. The private entries may specify the individual chemical molecule using a chemical structure format including, but not limited to SMILES, SLN, WLN, ROSDAL, and InChI. In another aspect, the relationships between the plurality of private entries may be determined according to a predetermined relationship rule, where each relationship represents a connection between one private entry and a related private entry from the private chemical dataset. The relationship rule may include, but is not limited to a structural neighbor relationship rule, a scaffold relationship rule, a scaffold tree relationship rule, a scaffold network relationship rule, and an R-group relationship rule.

In another aspect, a relationship network may be created based on the relationship determined from the application of the relationship rule. The relationship network may include a plurality of nodes and connections between nodes. Each node may represent a chemical molecule structure category and each connection may represent a connection between two categories according to the relationship rule. In various aspects, each private entry may be assigned to one of the plurality of nodes of the relationship network. In an aspect, a chemical cryptoset may include the relationship network and the number of private entries assigned to each node of the relationship network.

In various aspects, this method 1400 overcomes the limitations of previous methods of sharing chemical database information. The information content in molecular structures may be as low as 1 bit per atom based on information theory, which may be arrived at by empirically measuring the compression ratios of structures in SMILES format. Due to the low information content in molecular structures, a molecule structure may be recovered from commonly used molecule descriptors using any variety of methods.

This low information content in individual molecule structures represents a theoretical barrier to sharing chemical datasets in a secure manner. However, using this method 1400 in various aspects, chemical database information may be securely shared by sharing the relationships between molecules in a dataset in the form of a chemical cryptoset, instead of sharing descriptors of molecule structures. A chemical cryptoset contains the information required for many existing algorithms to analyze and visualize screening data without sharing specific details.

In various aspects of the method, structural descriptors may be used to compute the relationship between molecules in a dataset according to a relationship rule, after which the descriptors are set aside. Because this computation is conducted in a private space, the descriptors may be hidden to prevent reverse engineering of molecules.

There is less information in the relationships between molecules than there is in their structures, thus providing security of the chemical cryptosets. Although, the low information content in molecular structures precludes the use of structural descriptors to securely share chemical datasets. This low information content of structural descriptors also helps support the security of sharing the relationships between molecules.

The shared chemical cryptoset may be secure by rendering it un-linkable to other databases, either public or private. Because only degenerate information about structures may be shared in the form of relationships between structures, it may be difficult to measure how similar a molecule with known structure is to molecules in the private database by analysis of the chemical cryptoset. A potential intruder may compute a scaffold network from a molecule with known structure in an attempt to identify chemical structures within the chemical cryptoset, but it may be difficult to know how the nodes in this known network map to nodes in the chemical cryptoset network.

Decoupling the shared chemical data from the private chemical databases renders the chemical cryptoset resistant to reverse engineering of chemical structures. For example, a well-known strategy for reverse engineering chemical descriptors works by (1) generating candidate molecules with known structures, (2) checking to see if their descriptors are similar to the hidden structures' descriptors, and (3) modifying the candidates to improve the match between their descriptors and those of the hidden structures. Steps 2 and 3 become difficult because the actual descriptors of the hidden structures are excluded from chemical cryptosets formed using the method in various aspects.

In various aspects, the method for sharing chemical datasets may include sharing the relationships between molecules. Internally, one party may hold private data that consists of molecule structures associated with assay data. Using chemical cryptosets, the relationships between molecules in these datasets may be shared without revealing molecule structures. These relationships may be informative enough to use several important chemical informatics algorithms for screening data including, but not limited to assay data.

Figure 8:
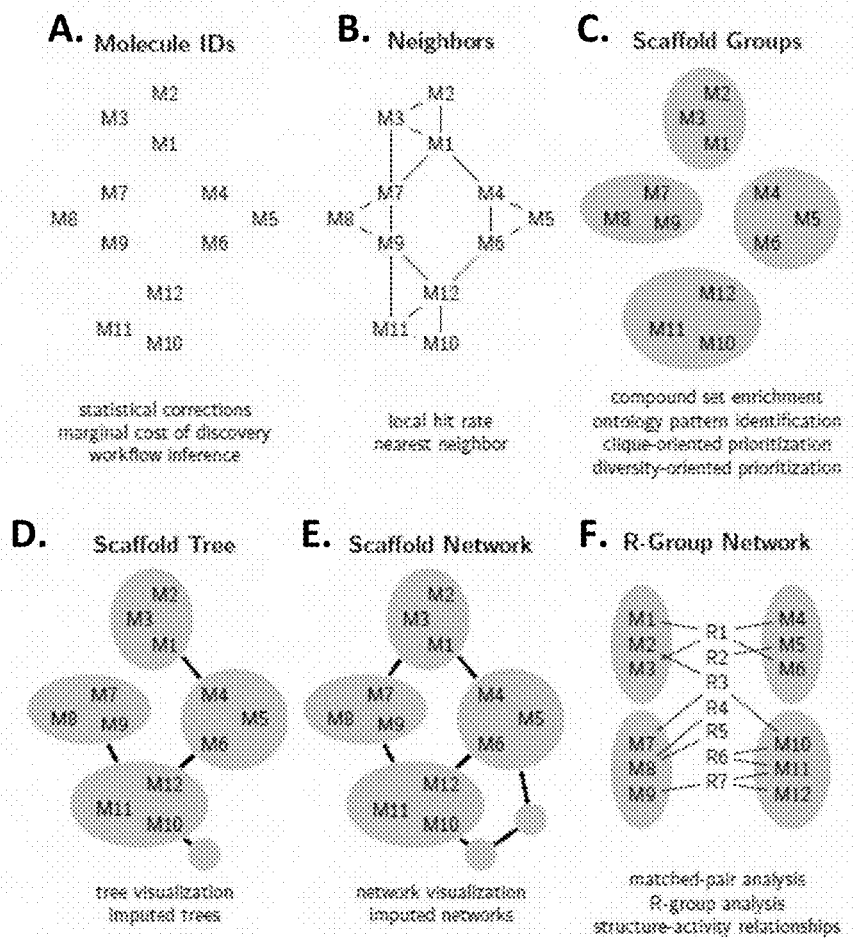
FIGS. 8A, 8B, 8C, 8D, 8E, and 8F illustrate various ways a chemical dataset may be organized for generating a chemical cryptoset.

FIGS. 8A, 8B, 8C, 8D, 8E, and 8F illustrate various ways a chemical dataset may be organized for generating a chemical cryptoset. In an aspect, a chemical dataset may be shared using molecule identifiers with assay data (FIG. 8A), entirely blinding all structural information. In a second aspect, chemical datasets may be shared by showing how molecules in a chemical dataset are connected to one another in a network using a nearest neighbor relationship rule (FIG. 8B). In a third aspect, chemical datasets may be shared by demonstrating how molecules are grouped together into scaffold groups using a scaffold group relationship rule (FIG. 8C). In a fourth aspect, chemical datasets may be shared by showing how these groups are connected into trees using a scaffold tree relationship rule (FIG. 8D). In a fifth aspect, chemical datasets may be shared by using how these groups are connected into networks using a scaffold network relationship rule (FIG. 8E). In a sixth aspect, chemical datasets may be shared by showing how molecules are connected together into R-group networks using an R-group relationship rule (FIG. 8F).

Chemical cryptosets may be obtained by encoding the datasets in the most compact text representation and then compressing this text. In one aspect, the text may be compressed using the bzip2 compression algorithm. The resulting file size, in bits, may serve as an estimate of the information content of the chemical dataset.

A. Molecule Identifiers with Assay Data

In an aspect, the chemical cryptoset may include molecule identifiers. In this aspect, although no information about chemical structures may be shared, there may still be enough information to perform analyses that do not depend on structure. A molecule identifier may be implemented by associating each molecule with a randomized number, a sequential number, an internal identifier for which there may be no public method of relating the identifier back to the chemical structures, or any other method of de-identifying the chemical structure. The chemical cryptoset may be associated with additional assay data in one aspect. Additionally, the chemical cryptoset may only include the number of molecules in the private chemical dataset. FIG. 8A illustrates the use of molecule identifiers to share chemical information.

Sharing molecule identifiers alone may be entirely secure because the identifier-molecule associations are private, and there may be no public method of relating the identifiers to the corresponding private structures. Sharing molecule identifiers may be safe because there is essentially zero information content within the chemical cryptoset, other than the size of the chemical dataset.

B. Screening Networks/Neighbors

In an aspect, the chemical cryptoset may make use of a representation of relationships of molecules that are structural neighbors. Structural neighbors may be determined using a structural neighbor relationship rule. FIG. 8B illustrates molecule identifiers and how they are connected to their structural neighbors in one aspect.

The structural neighbor relationship rule may include arranging molecules that have the same structural neighbors near one another. In an aspect, the chemical cryptoset from the structural neighbor relationship rule may include an adjacency matrix with the molecules with the same neighbors near one another in the matrix. The matrix may be encoded in a skyline format in one aspect.

Any known method of determining structural similarity between chemical structure may be used to define a structural neighbor relationship rule. Non-limiting examples of suitable similarity metrics for defining a structural neighbor relationship rule include a Tanimoto similarity, a Tversky similarity, a Hamming similarity, a Euclidian similarity, and any other suitable known similarity metric. By way of non-limiting example, a Tanimoto similarity may be used to compute a similarity between fingerprint representations of molecules. In other aspects, the fingerprint representation may incorporate at least one or more representation methods including, but not limited to binary vs. counts, various labeling nomenclatures for atoms, and various ways of computing and/or categorizing substructures. In various aspects, the structural neighbor relationship rule may computes a similarity or distance between all molecules in the database, from which neighbors may be computed.

The nearest neighbor information may be compressed in an aspect. The number of neighbors shared may range from about 1 to about 50. In various aspects, the number of neighbors may range from about 1 to about 10, from about 5 to about 15, from about 10 to about 20, from about 15 to about 25, from about 20 to about 40, and about 30 to about 50

Increasing the number of neighbors shared may increase the information in the chemical cryptoset. For example, the network constructed by sharing one neighbor is just 2.45 bits per molecule, compared with 38.58 bits per molecule in SMILES. There may be substantial improvements possible to the encoding and there may be more uninformative noise in this method if generating a chemical cryptoset than others.

Without being limited to a particular theory, a more distant neighbor may increase the information by more than closer neighbors. The closest neighbors are most informative for the purpose of chemical analysis. At the same time, the distant neighbors have the most noise. The difficulty in compressing distant neighbors may be more a consequence of their noise and difficulty encoding, rather than the quantity of information about molecule structures they contain.

The sharing of chemical cryptosets in the form of neighbor network relationships may be relatively vulnerable to reverse engineering algorithms designed to extract chemical structures relative to other cryptosets in the form of other relationships described herein below. In an aspect, a few neighbors for each molecule in the database may be shared in the chemical cryptoset to maintain security. The number of bits being shared per molecule may be compared to the number of bits in their SMILES strings to ensure a wide security margin.

C. Scaffold Groups

In an aspect, the chemical cryptoset may include which molecule identifiers are within the same scaffold group. FIG. 8C illustrates molecule identifiers organized into scaffold groups in an aspect. The scaffold groups may be determined using a scaffold relationship rule. In an aspect, the scaffold for a small-molecule may be obtained by removing all side chains (the R-groups) and retaining the rings and linkers connecting the side chains.

A scaffold relationship rule may include grouping molecules together if they share a common scaffold. The scaffold relationship rule may include forming a scaffold for each private entry and associating the scaffold with the private entry, comparing each scaffold to all other scaffolds formed from all of the other private entries, assigning a scaffold group to each subset of private entries associated with matching scaffold structures, and assigning one of the nodes to each scaffold group.

Figure 11:
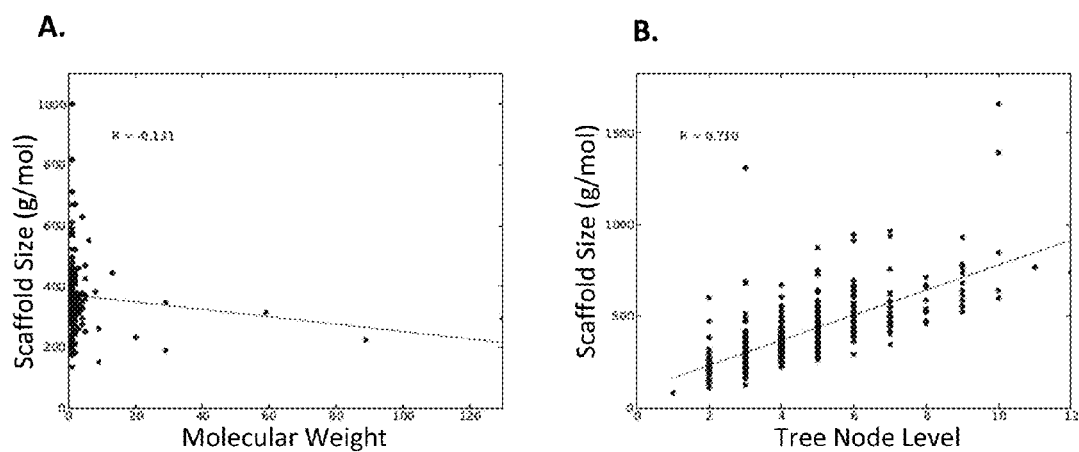
FIG. 11A is a graph illustrating a weak negative correlation between the number of molecules in a scaffold group and each molecule's molecular weight.
FIG. 11B is a graph illustrating that the molecular weight of the scaffolds loosely correlate with each scaffold's level in the scaffold tree.

Scaffold groups may share relatively more information (only 0.01 bits per molecule) than molecule identifiers described previously herein, and may impart comparable security. The scaffold group chemical cryptoset comprises essentially only the number of molecules in each scaffold group. Without being limited to any particular theory, the frequency of scaffolds is not known to be correlated with any particular chemical property. For example, there is only a very weak negative correlation between the number of molecules in a scaffold group and its molecular weight, as shown in FIG. 11A.

The most common scaffolds may occur in two different chemical datasets with significant frequency. For example, the most frequent scaffold in many screening libraries may be benzene or other common scaffolds and may be vulnerable to identification in datasets formed using scaffold groups. In an aspect, the most frequent/common scaffold groups may be broken into a number of smaller groups according to a scaffold splitting rule to reduce the likelihood of identifying the frequent/common scaffold. By way of non-limiting example, the scaffold splitting rule may be random or based on keeping molecules with similar R-groups together. However, because the most frequent scaffolds may also be the least interesting from a drug development perspective or other aspects, including common scaffold groups in a chemical cryptoset may not compromise the security of the chemical cryptoset.

D. Scaffold Trees

In an aspect, the chemical cryptoset may include how scaffold groups connect to one another in a scaffold tree. The scaffold trees may be formed by applying a scaffold tree relationship rule to scaffold groups determined herein above. Scaffold trees represent scaffolds as nodes in a network, connected using the scaffold tree relationship rule. The scaffold tree may include empty scaffold groups in one aspect. FIG. 8D illustrates a scaffold tree with a blank scaffold group in one aspect.

In an aspect, the scaffold tree relationship rule may include, but is not limited to forming a scaffold group and assigning one of the nodes of the relationship network to each scaffold group according to the scaffold relationship rule, decomposing each scaffold, and combining all nodes assigned to duplicate scaffolds by assigning all non-duplicate connections of a matching pair of nodes to a first matching node and deleting a second matching node of the matching pair of nodes. Each scaffold may be decomposed by removing a chemical substructure chosen from a ring or linker according to a scaffold tree decomposition rule. A first additional node may be assigned to the first decomposed scaffold and a connection may be assigned between the node and the first additional node. Each successive scaffold may be iteratively decomposed to form a subsequent decomposed scaffold. A subsequent node may be assigned to the subsequent decomposed scaffold and an additional connection may be assigned between the previous node and the subsequent node.

In an aspect, the scaffold tree decomposition rule may identify a single chemical substructure to be removed from each scaffold and may terminate decomposition if the scaffold consists of a single ring or linker.

Scaffold trees may contain a relatively small amount of information (1.96 bits per molecule), compared with 38.58 bits in SMILES strings. Scaffold trees may convey the same information as scaffold groups, and may have some of the same vulnerabilities. In the same way, these vulnerabilities may be countered by artificially splitting the nodes associated with the most frequent/common scaffolds into a number of smaller groups according to a scaffold splitting rule. This may ensure that, for example, the benzene scaffold To form a scaffold tree, each scaffold may be decomposed by striping rings, one at a time, according to the scaffold tree relationship rule. In an aspect, the scaffold tree relationship rule may include that every node has a single parent node and every scaffold may be the parent of a combinatorially large number of scaffolds with one more ring. There may be more than a million possible children for every scaffold in a scaffold tree. For example, approximately, each scaffold could have as many as 7.2 million children:

$$\text{\# children} = (LRA/N) \qquad \text{Eqn. (V)}$$

where L is the number of possible linkers between scaffold groups (about 1700 with up to 5 atoms in PubChem), R is the number of rings in a scaffold group (about 1700 of 5 to 7 atoms in PubChem), A is the number of ways the linker can attach a ring to a scaffold (about 5·N·5), and N is the number of rings in the parent scaffold. The division by N is introduced because the scaffold tree algorithm strips the least informative ring first in each decomposition. This one-to-many relationship between parent and child scaffolds is what produces the tree structure of the network, and is also what makes it difficult to reverse engineer the network into molecule structures. Even if one of the scaffolds is exposed (for example, by identifying the most frequent scaffold as benzene), there may be no way to know which correspond to the scaffold tree.

Scaffold trees may convey some general information about scaffolds. First, the level of the scaffold in the tree corresponds to the number of rings in the molecule. Second, because child scaffolds always contain one more ring than their parents, the molecule weight of scaffolds loosely correlates with their level in the tree, as illustrated in FIG. 11B.

In an aspect, chemical cryptosets created from scaffold trees may include the number of molecules in each scaffold group and the structure of the tree.

E. Scaffold Networks

In an aspect, the chemical cryptoset may include how scaffold groups connect together in a network. In an aspect, a chemical cryptoset may be generated using a scaffold network. The scaffold network chemical cryptoset may be formed by applying a scaffold network relationship rule to scaffold groups determined herein above. The scaffold network may include empty scaffold groups in one aspect. FIG. 8E illustrates a scaffold network with blank scaffold groups, in one aspect.

In an aspect, the scaffold network relationship rule may include, but is not limited to forming a scaffold group and assigning one of the nodes of the relationship network to each scaffold group according to the scaffold relationship rule, decomposing each scaffold, and combining all nodes assigned to duplicate scaffolds by assigning all non-duplicate connections of a matching pair of nodes to a first matching node and deleting a second matching node of the matching pair of nodes. Each scaffold may be decomposed by removing a chemical substructure chosen from a ring or linker according to a scaffold network decomposition rule. A first additional node may be assigned to the first decomposed scaffold and a connection may be assigned between the node and the first additional node. Each successive scaffold may be iteratively decomposed to form a subsequent decomposed scaffold. A subsequent node may be assigned to the subsequent decomposed scaffold and an additional connection may be assigned between the previous node and the subsequent node.

In an aspect, the scaffold network decomposition rule may identify all possible single chemical substructures to be removed from a higher-order scaffold and specify at least one decomposition of the higher-order scaffold by removing one of the possible single chemical substructures from the higher-order scaffold and terminating decomposition if the higher-order scaffold consists of a single ring or linker.

Scaffold networks may have an information content of 8.91 bits per molecule, which may be less than about four times the information molecule SMILES strings and about one half the information in scaffold SMILES strings.

Scaffold networks are closely related to scaffold trees and scaffold groups, inheriting many of their properties. For example, the level of scaffolds in the network may correspond with the number of rings in the scaffold. Likewise, there may be a weak correlation between molecular weight and a scaffold's level in the scaffold network. Moreover, because the number of molecules associated with each scaffold is known, the most frequent/common scaffolds may be identifiable. Similarly, this vulnerability may be countered by splitting the most frequent nodes into a number of smaller scaffold groups.

Networks record a many-to-many relationship between scaffold parents and children. In an aspect, scaffold networks may identify multiple parents for every scaffold group, each one identified by removing a different ring from the scaffold group. A scaffold network relationship rule may enumerate all possible decompositions of scaffolds. Using this rule, networks may identify important substructures that may sometimes be missed by scaffold trees.

Each scaffold group may be decomposed into a network of interconnected scaffolds in an intricate pattern. This pattern may convey information about the scaffold group, and scaffolds may produce different patterns. Scaffold networks may not provide enough information to reverse engineer structures. Scaffolds with very different chemical structures may yield networks with the same topology. Additionally, there may be very different scaffolds that may generate a single scaffold network topology. This many-to-one relationship between scaffold groups and specific topologies may provide that scaffold structures may not be reverse engineered from the scaffold network.

Figure 12:
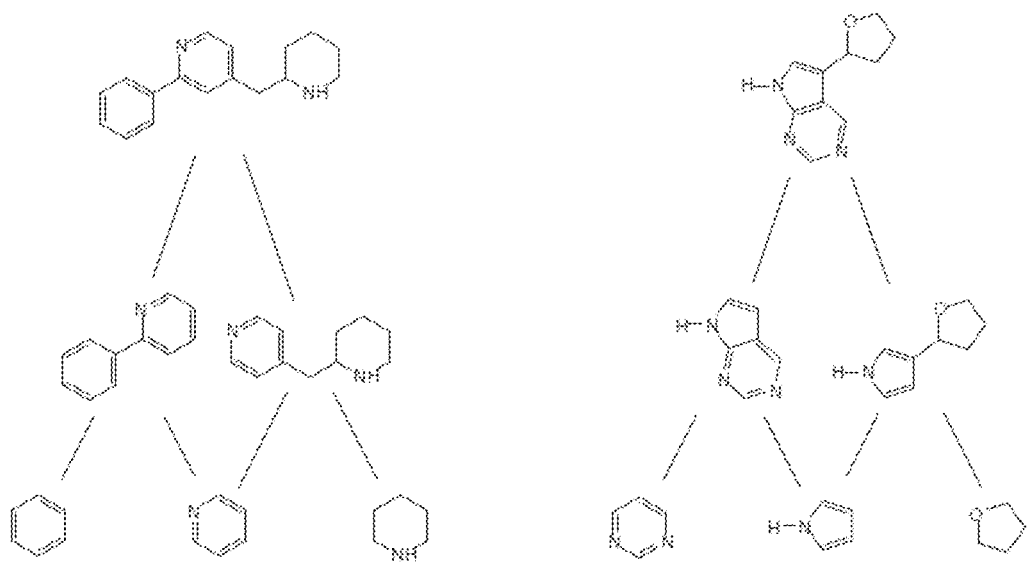
FIG. 12 are illustrations summarizing the chemical structures within two scaffolds that generate scaffold networks with the same topology.

Ignoring the chemical structures associated with each node in the scaffold network, scaffold groups belong to the same "equivalence class" if they produce scaffold networks with the same topology when decomposed. For example, FIG. 12 illustrates two scaffolds generating scaffold networks with the same topology. The scaffolds have the same number of rings but are otherwise very different. Therefore, the little information about the number of rings likely does not reveal much other important information about the chemical structure of the private molecules in the chemical dataset.

For example, PubChem has about 4.9 million scaffolds, which fall into about 160,000 equivalence classes. This demonstrates a high degeneracy between the network topology and chemical structure. Moreover, scaffolds in the same equivalence class may be structurally dissimilar from one another.

Figure 13:
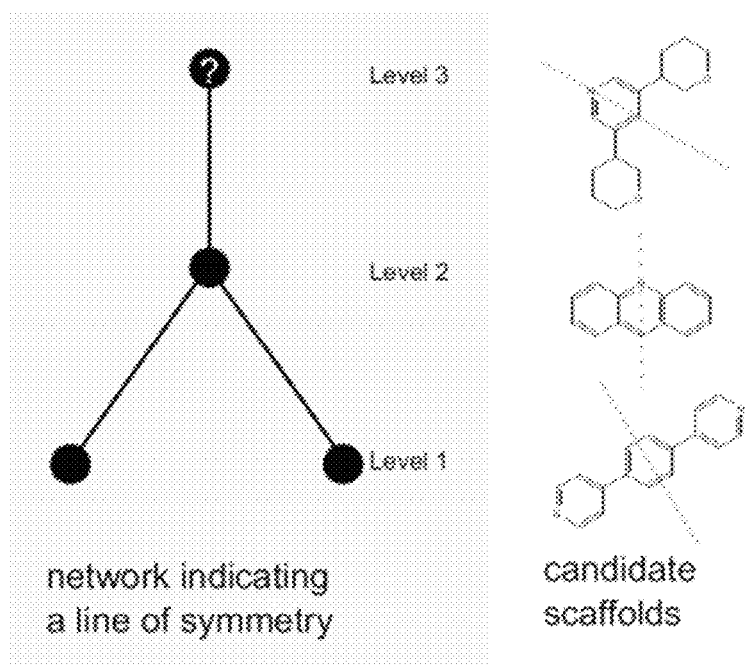
FIG. 13 is a schematic illustration of a scaffold network corresponding to scaffolds that have an axis of symmetry about each scaffold's central ring.

A scaffold network topology places constraints on the structure of a scaffold that could have generated it. For example, FIG. 13 shows a scaffold network for a scaffold that must have an axis of symmetry about its central ring. A conservative lower bound on the number of scaffolds that could generate the network may be computed. This bound may start with an example scaffold and detecting all the symmetries the scaffold contains. These symmetries may be used to identify the number of ring and linker choices possible and symmetry constraints on these choices. PubChem may be used as a library of allowable rings (from 5 to 7 atoms) and linkers (up to 5 atoms). Multiplying together the number of possible rings and linkers at each choice gives an estimate of the number of scaffolds consistent with the starting scaffold's network. This estimate is lower than the correct amount of rings because it does not count scaffolds with different ring topologies that can also yield the same scaffold network.

In an aspect, scaffold networks may not convey enough information to reliably reveal chemical structure.

F. R-group Networks

In an aspect, the relationship network may be an R-group scaffold network. R-group scaffold networks may be determined using an R-group relationship rule. In an aspect, the R-group relationship rule may create scaffold groups and annotate each molecule with the R-groups they contain for each chemical dataset. In an aspect, a chemical cryptoset may be generated from an R-group scaffold network generated from the R-group relationship rule. FIG. 8F illustrates scaffold groups with R-group associations in one aspect.

The R-group relationship rule may include, but is not limited to forming at least one scaffold group and assigning one of the nodes of the relationship network to each scaffold group according to the scaffold relationship rule, comparing all R-groups within a collection of R-groups removed from all individual chemical molecule structures specified by each of the private entries and assigning an additional node to each non-duplicate R-group within the collection of R-groups, and for each node assigned to a scaffold group, add a connection between the node assigned to the scaffold group and each node assigned to an R-group removed from any of the private entries associated with the scaffold of the scaffold group.

The R-group scaffold network may contain less than a quarter of the information in SMILES strings (6.34 compared with 38.58 bits per molecule). R-group scaffold networks may carry little information about the most important and variable portion of a molecule, its scaffolds. R-groups may have the same vulnerability as scaffold groups. The most frequent/common R-groups may be consistent across several datasets. For example, some frequent/common R-groups are methyl groups (—C), methoxy groups (—CO), halides (—Cl, —Br, and —F), and single heteroatoms (=S, =N, —N and —O). Because there may be fewer R-groups than scaffold groups, there may be risk that some R-groups may be exposed.

In a strategy similar to that used with scaffold groups, this vulnerability may be countered by artificially splitting nodes in the R-group network. In R-group networks, each R-group may be represented as a node in a graph, and molecules that have this group as a side-chain may be connect with an edge to the node. In the splitting operation, the node corresponding to a frequent R-group may be split in to several nodes, and the molecules that connected to the original node may be divided up across all the new nodes. The usefulness of the network may be preserved by grouping molecules that are close in chemical space (e.g. that are derivatives of the same or closely related scaffolds) together to connect to the same R-group node when the original R-group node is split. Without being limited to any particular theory, splitting nodes in the network may break the relationship between R-group frequency and molecular structure, and may make the network secure.

Without this counter measure, commonly encountered R-groups may be exposed. At the same time, exotic, rarely encountered side chains remain unidentifiable. It is importable to protect the identity of common R-groups in the network. However, knowing which common side chains a molecule has may reveal little about a molecule's structure. In some aspects, one might elect to reveal the exact structure of R-groups.

V. Systems for Generating Encrypted Chemical Datasets

Figure 15:
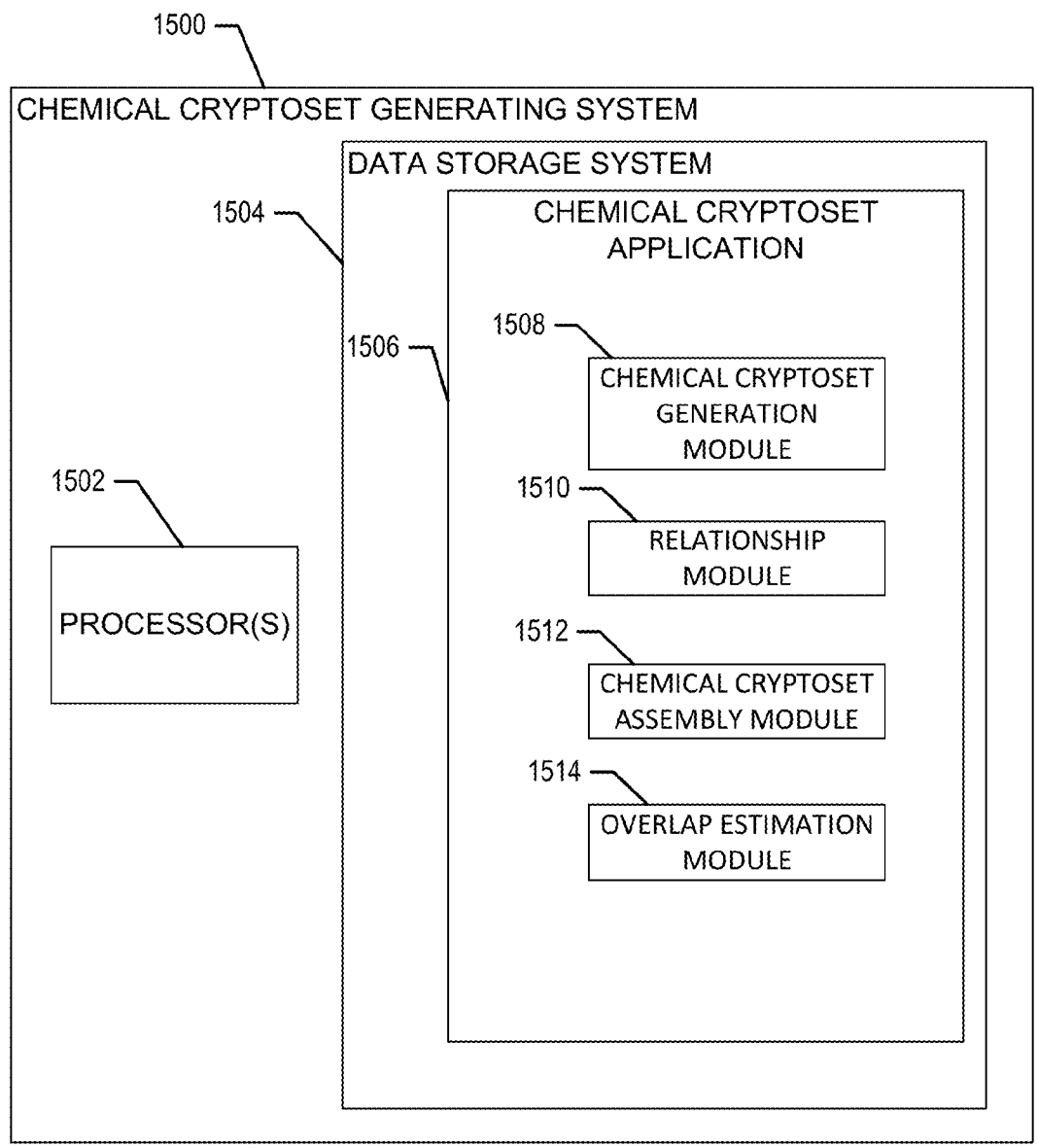
FIG. 15 is a block diagram summarizing the elements of a system for generating a cryptoset of a private chemical dataset for analyzing chemical data.

FIG. 15 is a system diagram illustrating the elements of a system 1500 for generating an encrypted representation of a private chemical dataset for analyzing screening data. The system 1500 may allow for the sharing of chemical datasets to securely enable collaborative analysis and yield insight into screening projects or screening technology. In an aspect, the system 1500 may be used for comparing two chemical datasets to determine the amount of overlap between the chemical datasets. The chemical datasets may be molecular libraries in one aspect.

The system 1500 may include at least one processor 1502 and at least one data storage system 1504. The data storage system may include a chemical cryptoset application 1506 as configured to execute on the at least one processor 1502. The chemical cryptoset application 1506 may include a chemical cryptoset generation module 1508, a relationship module 1510, and a chemical cryptoset assembly module 1512. In an aspect, the system may further include an overlap estimation module 1514.

The system 1500 may be receive an input of at least one private chemical dataset containing private chemical structures, organize the chemical dataset to create a relationship network for each molecule in the chemical dataset, encrypt the relationship network into a chemical cryptoset, and optionally estimate the overlap between two or more chemical cryptosets using the methods described previously herein. The chemical cryptoset may also be made public to share results of assay data or molecular libraries without making the chemical structures known.

A. Chemical Cryptoset Generation Module

Figure 9:
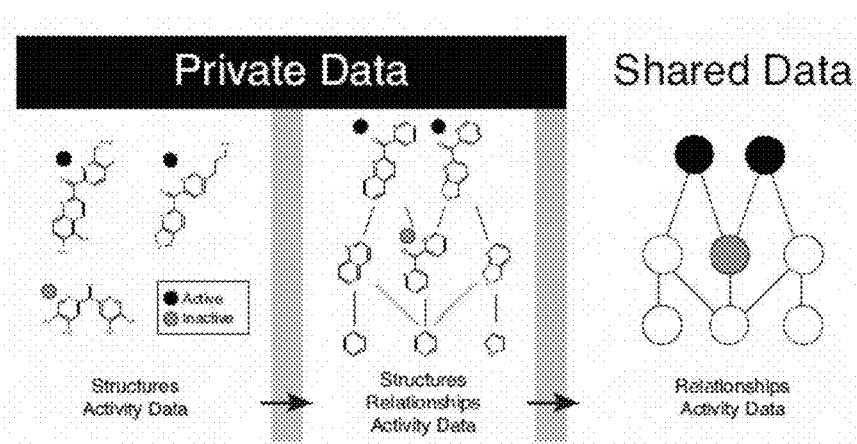
FIG. 9 is a schematic illustration of activity data associated with the molecules within the chemical dataset, the formation of a relationship network maintaining the activity data, and the formation of an anonymized relationship network with associated activity data that may be publically shared.

In various aspects, the system 1500 may include a chemical cryptoset generation module 1508. The chemical cryptoset generation module 1508 may receive an encryption request, transmit the chemical cryptoset, or perform any other function relating to the input and output of the generation of a chemical cryptoset. The encryption request may include a private chemical dataset with a plurality of chemical structures. In an aspect, the chemical dataset may include results of a particular assay. In another aspect, the chemical dataset may include de-identified structure activity data. FIG. 9 is an illustration of activity data associated with the molecules within the chemical dataset, the relationship network maintaining the activity data, and the anonymized relationship network with activity that may be publically shared. The data received by the chemical cryptoset generation module may be used as the input for the relationship module. In an aspect, the chemical cryptoset generation module may receive more than one encryption request, corresponding to more than one private chemical dataset simultaneously.

Once the chemical cryptoset has been generated, or at any other point in the process, the chemical cryptoset generation module 1508 may transmit the chemical cryptoset to a remote computing device. In an aspect, the transmitted chemical cryptoset may then be shared publically with others.

B. Relationship Module

The relationship module 1510 may receive the private chemical dataset information from the chemical cryptoset generation module 1508. In this module 1510, a relationship rule may be applied to the private chemical dataset. The relationship may transform private entry elements into a relationship network, using the methods described herein above. In an aspect, the relationship network may include but is not limited to molecule identifiers, nearest neighbors, scaffold groups, scaffold trees, scaffold networks, and R-group networks.

In an aspect, the relationship rule may include computing the Bemis-Murcko scaffolds of all molecules in the chemical database. Scaffolds are the ring system of a molecule, with all side chains (the R-groups) removed. The scaffold may then be iteratively decomposed, removing each ring one at a time to systematically generate smaller scaffolds. In an aspect, scaffold trees may decompose each scaffold in a single way, based on a set of predefined rules according to a scaffold tree relationship rule. In another aspect, scaffold networks may decompose scaffolds in all possible ways according to a scaffold network relationship rule. Applying the relationship rule may result in a set of scaffolds, R-groups, and connections between scaffolds.

The scaffolds and R-groups may first be represented as SMILES strings. To share these relationships, the SMILES strings may be blinded, an identifier for each scaffold and R-group may be generated, such as a molecule identifier, and these anonymous identifiers, with connections between molecules, scaffolds, and R-groups may be shared. In an aspect, a scaffold network computed from a single molecule may be a directed, multipartite graph. The connectivity of this graph, its topology, may be a signature for the molecule. The signature may be non-informative because very different molecules can generate identical networks.

The relationship network generated by the relationship module 1510 may be used as an input into the encryption module.

D. Chemical Cryptoset Assembly Module

The chemical cryptoset assembly module 1512 may produce a chemical cryptoset composed of a plurality of elements from the relationship network. Each element may be associated with assay results or the number of molecules with a particular attribute as defined by the relationship rule.

In an aspect, the chemical cryptoset may be represented by a matrix with each scaffold group within the relationship network represented by a node. In some aspects, a node may be divided into more than one node to maintain anonymity. The chemical cryptosets may be provided in a format that is secure and sharable. In an aspect, one or more chemical structure may be associated with each node of the chemical cryptoset.

The size of the chemical cryptoset may be influenced by the total number of molecules in the chemical dataset and the resulting number of scaffold groups in the relationship network. The security of the chemical cryptoset may be tuned by adjusting the size of the chemical cryptoset and adjusting the nodes when necessary.

Chemical cryptosets may then be transmitted to a remote computing device for storing, sharing, or transferring to others. A chemical cryptoset may be used to compare against another cryptoset to estimate the overlap between the corresponding private chemical datasets.

E. Overlap Estimation Module

The overlap estimation module 1514 may estimate the proportion of overlap between two private chemical datasets using their respective chemical cryptosets. The overlap estimation module 1514 may apply an overlap rule to the chemical cryptosets. An estimate of the proportion of overlap between the private chemical datasets may result from the application of the overlap rule. Once the overlap between the chemical datasets has been estimated, the information may be transmitted to a remote computing device by the chemical cryptoset generation module.

In another aspect, the overlap estimation module 1514 may compare two or more chemical cryptosets.

EXAMPLES

The following examples are included to demonstrate preferred embodiments of the invention. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Illustrative Example 1

Using Cryptosets for Comparison of Data

In an example, cryptosets may be generated from private data and used to compare the private data. For example, a private identifier generated using a regularization rule was defined as a person's name and date of birth in a particular format (e.g. "obamab08041961" and "romneym03121947"). The private identifiers were converted to public identifiers using a degenerate mapping rule, such as the hash function defined as the Sha256 digest of the private identifier concatenated with the string "MYSALT." The length of the cryptoset was chosen to be 1000. A dataset's histogram of public identifiers may then be published, ranging from zero to one thousand in this case, as the cryptoset. This cryptoset had a length of 1000 and a size equal to the number of items (people in this case) placed in it.

In this example, Obama would have public identifier of 838 and Romney would have a public identifier of 89. While these two individuals have different public identifiers, each public identifier could correspond to any one of a very large number of people. As many as twelve million living people have either Obama's or Romney's public identifier. This degenerate, many-to-one mapping is a key feature of cryptosets, from which its security arises. Even though it is easy to compute a public identifier for any item, the item's membership in a set may not be known.

The definition of private identifiers, regularization rule, degenerate mapping rule, and cryptosets may be freely shared without giving away the identities of people in the private dataset. In this example, the overlap between two private datasets was estimated as the product of the Pearson correlation of their public identifier histograms and the geometric mean of their sizes.

Illustrative Example 2

Using Cryptosets for Comparison of Medical Records

In an example, cryptosets relating to private medical records may be used and compared to estimate the overlap between two sets of medical records. Several independent hospitals, outpatient clinics, and pharmacies in the same geographic may want to link some of their medical records together for the purposes of reducing duplicate testing, identifying fraud, detecting drug seeking behavior, or monitoring prescription compliance. Sharing the data required to do this on an ongoing basis may be difficult, may require institutional commitment and some risk. In this context, only those entities serving overlapping patient populations need to share data. Without directly revealing patient information, the extent to which these populations overlap may be estimated with cryptosets. For example, a hospital might use cryptosets to identify outpatient clinics that serve the patients visiting its emergency room. These clinics could share important health information with the hospital for use in emergencies.

For example, consider two rare disease research registries. Although both registries concern the same rare disease, one may contain mostly neuroimaging data while the other may contain mostly genotype and phenotype data. If these registries have a sufficient number of patients in common to meet an a priori threshold for statistical power, then combining these datasets would enable researchers to address imaging genetics research questions that may not have been anticipated by the creators or funders of either registry. Depending on the overlap, the researchers may decide to undergo the process to obtain approval to combine the datasets. Finally, overlap estimates are often needed to evaluate the independence of samples. For example, rare disease researchers who publish from multiple registries may need a way to assess the overlap in patients among them. These researchers may typically want to see minimal overlap between data sets so the papers published on different cohorts may be considered independent.

Illustrative Example 3

Using Cryptosets for Comparison of Genomic Data

In an example, cryptosets may be used for comparing genomic datasets. The sharing-privacy dilemma is not unique to healthcare delivery; it is evident wherever the risks and benefits of sharing are high, and it is particularly acute in genomic medicine. The desire to share the genomic data of large groups of people may be increasing. Once patient genomes are routinely sequenced in clinical care, genetic data linked to health records may be used to reduce the cost and improve the quality of healthcare. However, the sensitive information in health records makes privacy important.

Moreover, genomic data is particularly sensitive and important to keep private. First, raw genomic data may be difficult to anonymize, especially as sequencing becomes more common. Several studies demonstrate how genetic data can be reidentified and associated with individual patients. For example, individual patients may be re-identified with as few as 75 SNP markers. Even the published SNPs from genome-wide association studies may be used to identify patients. Recreational genealogy websites have been used to link surnames to short tandem repeats in Y chromosomes. Second, a person can never be disassociated from their DNA sequence. Unlike a credit card number, which can be cancelled, a person's genomic data continues to reveal more private information as understanding of genetics advances. Third, because DNA sequences are shared between relatives, violating a patient's genomic privacy may also violate the privacy of their relatives.

Example 1

Generating a Cryptoset from Census Data

A relatively uniform cryptoset was generated from highly patterned census data to demonstrate the many-to-one distribution and deidentification of private data to demonstrate cryptoset security. FIGS. 5A, 5B, and 5C illustrate how names and birth dates are distributed with discernible patterns in census data. For example, surnames follow a power law distribution, with a few very common names and a long tail of uncommon names. Birth years fall in a comparatively narrow range. Birthdays follow a seasonal and weekly cycle. 250,000 private identifiers were created from names with dates of birth. The private identifiers were then encrypted using a hash function to generate uniformly distributed public identifiers, as illustrated in FIG. 5D. Moreover, people binned to the same public identifier have no real-world connection to one another. FIG. 5E illustrates the actual overlap between hypothetical datasets A, B, and C. FIG. 5F demonstrates histograms for each of the cryptosets that were used to estimate the overlap between private datasets. FIG. 5G illustrates the correlation between the cryptosets, comparing A to B and A to C, to estimate the overlap. FIG. 5H illustrates the estimated overlap of the private datasets based on the private datasets. These estimates were computed by multiplying the correlation between cryptosets by the geometric mean of their size. P-values, confidence intervals, and other statistical measures of these estimates were also computed.

Example 2

Cryptoset Security and Accuracy May be Adjusted

Cryptoset security and overlap accuracy may be tuned by adjusting the dataset size and cryptoset length. FIG. 6 illustrates how cryptosets become more secure as datasets grow and they also estimate the overlap between private datasets with accuracy tunable by cryptoset length and insensitive to dataset size. Each column of figures corresponds to a different cryptoset length, 500, 1000 and 2000. The top row illustrates how both empirically (dots) and analytically (line) the information given away about specific public identifiers approaches zero—information theoretic security—as datasets grow. The second row shows the results of an empirical study, demonstrating that the accuracy of estimates is tuned by the length of cryptosets and the relative error is stable across all dataset sizes. The third row shows that the analytically derived 95% confidence intervals closely match the distribution of empirical estimates, and are also tuned by length and stable across all dataset sizes.

Example 3

Estimating Overlap of Molecular Libraries

Figure 7:
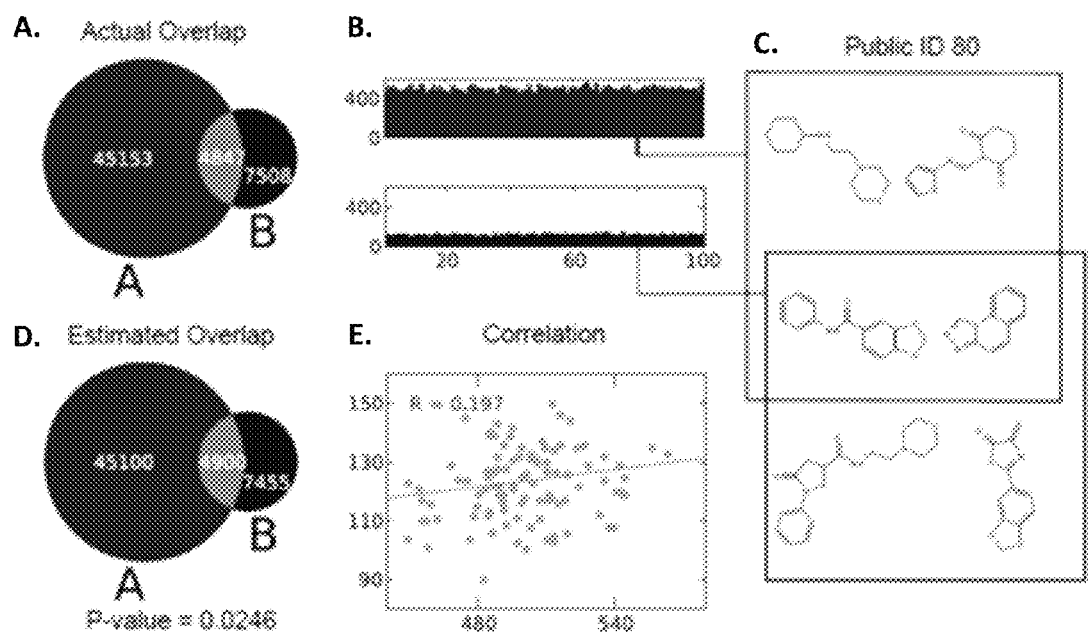
FIGS. 7A, 7B, 7C, 7D, and 7E illustrate the comparison of two private datasets for molecular libraries.

FIGS. 7A, 7B, 7C, 7D, and 7E illustrate the comparison of two private datasets for molecular libraries, the distribution across cryptosets, and the correlation computation between the cryptosets. In this example, two molecular libraries were compared, which have about 5000 molecules in common, as illustrated in the actual overlap in FIG. 7A. The libraries' molecules were nearly evenly distributed across public identifiers in the cryptoset in FIG. 7B, but a subtle, statistically significant correlation demonstrated they overlap as illustrated in FIGS. 7D and 7E. Moreover, within each public identifier bin (representative examples shown for one bin in FIG. 7C), there are both molecules unique and common to each library, and there is no way to determine which are which from the cryptosets. Sharing overlaps between molecular libraries could help researchers know when it makes sense to screen a private molecule library with a biological assay.

Example 4

Chemical Database

Figure 10:
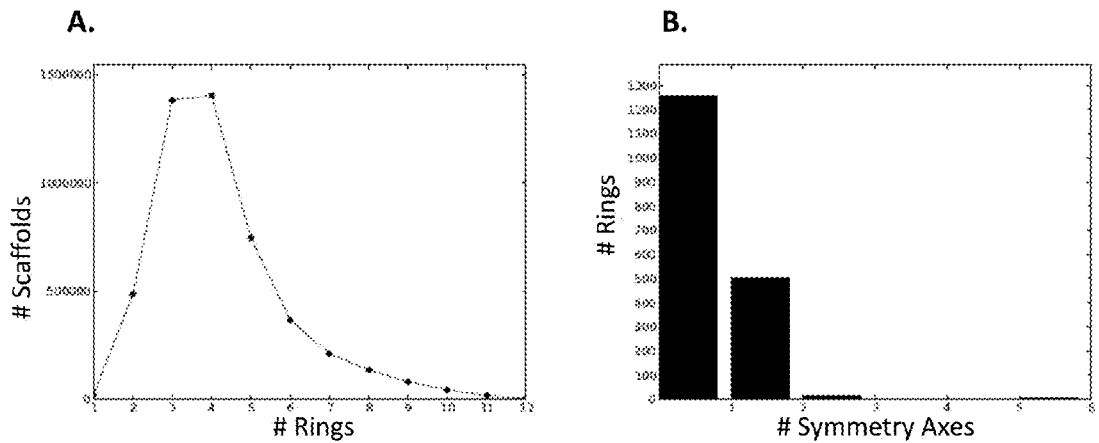
FIG. 10A shows the distribution of scaffolds in the PubChem dataset by number of rings.
FIG. 10B shows the distribution of rings from PubChem over their number of symmetry axes.

The publicly available chemical assay data from the PubChem database was used to test the methods of sharing relationships between molecules. This database includes approximately 10 million molecules. After generating scaffold networks for these molecules, a total of approximately 5 million unique scaffolds were identified. The scaffolds generated from this dataset have diverse structures, containing approximately 20000 distinct rings from 3 to 9 atoms in size. In this dataset, most scaffolds have three to five rings and most rings are symmetrical. FIG. 10A shows the distribution of scaffolds in the PubChem dataset by number of rings. FIG. 10B shows the distribution of rings from PubChem over their number of symmetry axes. These results demonstrate that most rings are asymmetric.

For equivalence classes with either one example in PubChem or with intra-group similarity greater than 0.5, the number of scaffolds that could have produced the same network were counted. On average, there were 3.5 billion scaffolds associated with each equivalence class, demonstrating that these scaffold networks are not specific fingerprints of scaffold structure. In some aspects, a few networks may be specific to scaffold structure, requiring symmetry along several axes. These cases could be removed from a dataset before sharing in one aspect.

Example 5

Scaffolds, Trees, Networks, and R-Groups

An in-house implementation of scaffold groups, trees and networks was used, which borrows code from the ScaffoldHunter software, but can run across all of the data in PubChem. This software works by computing the Bemis-Murcko scaffolds of all molecules in the database. These scaffolds are the ring system of a molecule, with all side chains (the R-groups) removed. This scaffold is then iteratively decomposed, removing each ring one at a time to systematically generate smaller scaffolds.

Scaffold trees decompose each scaffold in a single way, based on a set of predefined rules. Scaffold networks decompose scaffolds in all possible ways. The end result of this analysis is a set of scaffolds, R-groups, and connections between scaffolds. We represent the scaffolds and R-groups as SMILES strings. To share these relationships, the SMILES strings would be blinded, an ID for each scaffold and R-group would be generated, and these anonymous IDs, with connections between molecules, scaffolds, and R-groups would be shared.

Example 6

Scaffold Network Comparison and Molecule Similarity

A scaffold network computed from a single molecule is a directed, multipartite graph. The connectivity of this graph, its topology, is a signature for the molecule. It is a noninformative signature because very different molecules can generate identical networks. To show this, the open source graph software Nauty was used to produce canonical representations of scaffold networks of every molecule in PubChem.

To evaluate the diversity of molecules in a given network equivalence class, each molecule in an equivalence class was compared to other molecules in that class via Tanimoto Coefficient using the default FP2 fingerprint provided by the Open Babel Python API.

Example 7

Information Content Estimates

The relationships between molecules in any molecular database can be shared using the methods described above. The amount of information was approximately quantified, in bits, that each of these methods revealed about the data with a simple empirical strategy. First, a file containing all the data that would be shared by a method under consideration was created. Second, the most compact way possible of representing this data in a string was found. Third, after converting the file into the compact string representation, the data was compressed using a string compression utility. The size of the compressed file puts an upper bound on the amount of information shared by the method.

The compressed size of a dataset is an estimate of the amount of information in a specific dataset. If the compression is reversible, the compressed size of a dataset puts an upper bound on its information content. This is just an estimate, not exact, because the compression size is increased by (1) non-informative noise in a dataset and (2) any inefficiency in the compression protocol. The first will influence the estimates of information content of nearest neighbors. The second is evident because some text encodings with the same information will compress to different sizes. For example, the same molecules will not compress to the same size if encoded in SDF format instead of SMILES strings.

Nonetheless, the compression size estimate of information content is useful because the true information content is always less than compression size. If there is a wide margin between information in the hidden structures and shared data, there is good reason to believe that algorithms to reverse engineer the data to expose the structures are not possible.

All the methods of sharing relationships between molecules contain substantially less information than SMILES strings. Table 1 displays the compression efficiency (measured in bits per molecule, scaffold or atom) which puts an upper-bound on the amount of information shared with each method.

TABLE 1

Compression Efficiency Comparison

|  | Mol. Atom | Scaffold Atom | Molecule | Scaffold |
|---|---|---|---|---|
| Molecule SMILES | 1.49 | 3.57 | 38.58 | 77.64 |
| Molecule ID | 0 | 0 | 0 | 0 |
| R-Group Network | 0.24 | 0.59 | 6.34 | 12.76 |
| 1 Neighbor | 0.095 | 0.23 | 2.45 | 4.93 |
| 3 Neighbors | 0.69 | 1.66 | 17.95 | 36.13 |
| 5 Neighbors | 1.29 | 3.09 | 33.39 | 67.20 |
| 7 Neighbors | 1.86 | 4.46 | 48.20 | 97.00 |
| 9 Neighbors | 2.39 | 5.72 | 61.86 | 124.49 |
| Scaffold SMILES | 0.56 | 1.33 | 14.43 | 29.04 |
| Scaffold Group | 0.00048 | 0.0012 | 0.013 | 0.025 |

TABLE 1-continued

Compression Efficiency Comparison

|  | Mol. Atom | Scaffold Atom | Molecule | Scaffold |
|---|---|---|---|---|
| Scaffold Tree | 0.081 | 0.18 | 1.96 | 3.94 |
| Scaffold Network | 0.34 | 0.82 | 8.91 | 17.93 |

It was not possible to reconstruct structures from sharing less information than SMILES stings. The top group of methods share per-molecule information and were compared with the information content of molecules' SMILES strings. The bottom group of methods share per-scaffold information and should be compared with the information content of the scaffolds' SMILES strings. Most of the methods for sharing the relationships between molecules contain less information than SMILES strings by a wide margin, suggesting that, on average, they are secure. The one exception to this was sharing more than a few structural neighbors.

These results were obtained by encoding the data in the most compact text representation and then compressing this text with the bzip2 compression algorithm. The resulting file size, in bits, is an estimate of the information content. These results directly overcome the information barrier to securely sharing chemical information.

For these experiments the data in Assay 504333 from PubChem was used, which included data much like that from most high-throughput screens. This screen contained 350,000 molecules of, on average, 25.9 atoms per molecule and about 173,000 scaffolds with about 21.8 atoms each. The SMILES strings from all of the molecules and the scaffolds of these molecules were collected into two files. These files were sorted and compressed to yield the baseline information content against which to compare other methods.

The molecule identifiers contained almost zero information because all that was conveyed was the total number of molecules, a number which can be encoded in just a few characters of text.

Scaffold groups revealed only the number of molecules in a large number of groups. These were encoded by putting the scaffold groups' sizes in sorted order, and storing, in text, numerical difference between each size. This is called "run-length" encoding, and is commonly used to improve compression.

Scaffold trees were encoded in a notation that included the number of molecules in each scaffold group and the structure of the tree.

Scaffold networks were encoded by the number of molecules in each scaffold group and a sparse adjacency matrix, which recorded how the scaffolds were connected. In this matrix, scaffolds were reordered so scaffolds connected to one another were closer in the matrix (using the Reverse Cuthill-McKee algorithm). The matrix was encoded in a skyline format to improve compression.

The nearest neighbors were encoded by compressing an adjacency matrix of the whole dataset. The molecules in this dataset were reordered using the Reverse Cuthill-McKee algorithm to put molecules in the matrix with the same neighbors near one another, and the matrix was encoded in skyline format.

The R-group network was encoded by storing an integer identifier and count for the R-groups associated with each molecule. Each molecule was stored on a separate line and the integer identifiers were stored in sorted order and run length was encoded. One more sort across the entire dataset brought molecules with the same R-groups into close proximity and, thereby, improved compression.

With only one exception, nearest neighbors with more than a few neighbors, all representations compressed to smaller sizes that SMILES strings by a wide margin. This demonstrates that there is strong theoretical basis behind using these representations to share molecule data.

It may be still theoretically possible that a method concentrates its information in a narrow region of chemical space and can, therefore, compromise the security of specific molecules. Moreover, some general information about structures may be conveyed by these representations.

Having described the invention in detail, it will be apparent that modifications and variations are possible without departing from the scope of the invention defined in the appended claims. Those of skill in the art should, however, in light of the present disclosure, appreciate that many changes could be made in the specific embodiments that are disclosed and still obtain a like or similar result without departing from the spirit and scope of the invention, therefore all matter set forth herein is to be interpreted as illustrative and not in a limiting sense.

What is claimed is:

1. A method for generating an encrypted representation of a private chemical dataset for comparison with a second encrypted representation of a second private chemical dataset to determine an overlap between the private chemical dataset and the second private chemical dataset in a secure manner, the method comprising:
receiving an encryption request at at least one processing system, the encryption request comprising a plurality of private entries, wherein each of the private entries specifies an individual chemical molecule structure of the private chemical dataset;
determining a plurality of relationships between the plurality of private entries according to a predetermined relationship rule, wherein each relationship represents a connection between one private entry and a related private entry from the plurality of private entries;
creating a relationship network comprising a plurality of nodes and connections between nodes, wherein each node represents a category of chemical molecule structure according to the predetermined relationship rule, and each connection represents a connection between two categories according to the predetermined relationship rule;
assigning each private entry to one of the plurality of nodes of the relationship network;
producing a chemical cryptoset comprising the relationship network and the number of private entries assigned to each node of the relationship network; and
transmitting the chemical cryptoset to a remote computing device.

2. The method of claim 1, wherein the one or more private entry elements specifies the individual chemical molecule using a chemical notation format chosen from: SMILES, SLN, WLN, ROSDAL, and InChI.

3. The method of claim 1, wherein the predetermined relationship rule is chosen from: a structural neighbor relationship rule, a scaffold relationship rule, a scaffold tree relationship rule, a scaffold network relationship rule, and an R-group relationship rule.

4. The method of claim 3, wherein the structural neighbor relationship rule comprises a similarity metric chosen from Tanimoto similarity, Tversky similarity, Hamming similarity, and Euclidian similarity.

5. The method of claim 3, wherein the scaffold relationship rule comprises:
forming a scaffold for each of the private entries by removing all R-groups comprising side chains and retaining all rings and linkers of each chemical molecule structure specified by each private data entry, and associating the scaffold with the private entry;
comparing each scaffold to all other scaffolds formed from all of the other private entries;
assigning a scaffold group to each subset of private entries associated with matching scaffold structures; and
assigning one of the nodes of the relationship network to each scaffold group.

6. The method of claim 3, wherein the scaffold tree relationship rule comprises:
forming at least one scaffold group and assigning one of the nodes of the relationship network to each scaffold group according to the scaffold relationship rule;
for each node:
decomposing the assigned scaffold of the node by removing a chemical substructure chosen from a ring or a linker from the assigned scaffold to form a first decomposed scaffold according to a scaffold tree decomposition rule;
assigning a first additional node to the first decomposed scaffold and assigning a connection between the node and the first additional node; and
iteratively decomposing each successive scaffold of each successive node to form a subsequent decomposed scaffold, assigning a subsequent node to the subsequent decomposed scaffold, and assigning an additional connection between the previous node and the subsequent node; and
combining all nodes assigned to duplicate scaffolds by assigning all non-duplicate connections of a matching pair of nodes to a first matching node and deleting a second matching node of the matching pair of nodes.

7. The method of claim 6, wherein the scaffold tree decomposition rule uniquely identifies a single chemical substructure to be removed from each scaffold and terminates decomposition if the scaffold consists of a single ring or linker.

8. The method of claim 3, wherein the scaffold network relationship rule comprises:
forming at least one scaffold group and assigning one of the nodes of the relationship network to each scaffold group according to the scaffold relationship rule;
for each node:
iteratively decomposing the assigned scaffold of the node by removing a chemical substructure chosen from a ring or a linker from the assigned scaffold to form at least one decomposed scaffold according to a scaffold network decomposition rule;
assigning an additional node to each decomposed scaffold and assigning a connection between the node and each additional node; and
iteratively decomposing each successive scaffold of each successive node to form at least one subsequent decomposed scaffold according to the scaffold network decomposition rule, assigning a subsequent node to each subsequent decomposed scaffold, and assigning an additional connection between the successive node and each subsequent node; and
combining all nodes assigned to duplicate scaffolds by assigning all non-duplicate connections of a matching pair of nodes to a first matching node and deleting a second matching node of the matching pair of nodes.

9. The method of claim 8, wherein the scaffold network decomposition rule identifies all possible single chemical substructures to be removed from a higher-order scaffold and specifies at least one decomposition of the higher-order scaffold comprising removing one of the possible single chemical substructures from the higher-order scaffold and terminates decomposition if the higher-order scaffold consists of a single ring or linker.

10. The method of claim 5, wherein the R-group relationship rule comprises:
forming at least one scaffold group and assigning one of the nodes of the relationship network to each scaffold group according to the scaffold relationship rule;
comparing all R-groups within a collection of R-groups removed from all individual chemical molecule structures specified by each of the plurality of private entries and assigning an additional node to each non-duplicate R-group within the collection of R-groups;
for each node assigned to a scaffold group, adding a connection between the node assigned to the scaffold group and each node assigned to an R-group removed from any of the private entries associated with the scaffold of the scaffold group.

11. A system for generating an encrypted representation of a private chemical dataset for comparison with a second encrypted representation of a second private chemical dataset to determine an overlap between the private chemical dataset and the second private chemical dataset in a secure manner, the system comprising:
at least one processor;
at least one data storage system; and
an application executed by the at least one processor to:
receive an encryption request at at least one processing system, the encryption request comprising a plurality of private entries, wherein each of the private entries specifies an individual chemical molecule structure of the private chemical dataset;
determine a plurality of relationships between the plurality of private entry elements according to a predetermined relationship rule, wherein each relationship represents a connection between one private entry and a related private entry from the plurality of private entries;
create a relationship network comprising a plurality of nodes and connections between nodes, wherein each node represents a category of chemical molecule structure according to the predetermined relationship rule, and each connection represents a connection between two categories according to the predetermined relationship rule;
assign each private entry to one of the plurality of nodes of the relationship network;
produce a chemical cryptoset comprising the relationship network and the number of chemical molecules assigned to each node of the relationship network; and
transmit the chemical cryptoset to a remote computing device.

12. The system of claim 11, wherein the one or more private entries specifies the individual chemical molecule using a chemical notation format chosen from: SMILES, SLN, WLN, ROSDAL, and InChI.

13. The system of claim 11, wherein the predetermined relationship rule is chosen from: a structural neighbor relationship rule, a scaffold relationship rule, a scaffold tree relationship rule, a scaffold network relationship rule, and an R-group relationship rule.

14. The system of claim 13, wherein the structural neighbor relationship rule comprises a similarity metric chosen from Tanimoto similarity, Tversky similarity, Hamming similarity, and Euclidian similarity.

15. The system of claim 13, wherein the scaffold relationship rule comprises:
forming a scaffold for each of the private entries by removing all R-groups comprising side chains and retaining all rings and linkers of each chemical molecule structure specified by each private data entry, and associating the scaffold with the private entry;
comparing each scaffold to all other scaffolds formed from all of the other private entries;
assigning a scaffold group to each subset of private entries associated with matching scaffold structures; and
assigning one of the nodes of the relationship network to each scaffold group.

16. The system of claim 13, wherein the scaffold tree relationship rule comprises:
forming at least one scaffold group and assigning one of the nodes of the relationship network to each scaffold group according to the scaffold relationship rule;
for each node:
decomposing the assigned scaffold of the node by removing a chemical substructure chosen from a ring or a linker from the assigned scaffold to form a first decomposed scaffold according to a scaffold tree decomposition rule;
assigning a first additional node to the first decomposed scaffold and assigning a connection between the node and the first additional node; and
iteratively decomposing each successive scaffold of each successive node to form a subsequent decomposed scaffold, assigning a subsequent node to the subsequent decomposed scaffold, and assigning an additional connection between the previous node and the subsequent node; and
combining all nodes assigned to duplicate scaffolds by assigning all non-duplicate connections of a matching pair of nodes to a first matching node and deleting a second matching node of the matching pair of nodes.

17. The system of claim 16, wherein the scaffold tree decomposition rule uniquely identifies a single chemical substructure to be removed from each scaffold and terminates decomposition if the scaffold consists of a single ring or linker.

18. The system of claim 13, wherein the scaffold network relationship rule comprises:
forming at least one scaffold group and assigning one of the nodes of the relationship network to each scaffold group according to the scaffold relationship rule;
for each node:
iteratively decomposing the assigned scaffold of the node by removing a chemical substructure chosen from a ring or a linker from the assigned scaffold to form at least one decomposed scaffold according to a scaffold network decomposition rule;
assigning an additional node to each decomposed scaffold and assigning a connection between the node and each additional node; and
iteratively decomposing each successive scaffold of each successive node to form at least one subsequent decomposed scaffold according to the scaffold network decomposition rule, assigning a subsequent node to each subsequent decomposed scaffold, and assigning an additional connection between the successive node and each subsequent node; and
combining all nodes assigned to duplicate scaffolds by assigning all non-duplicate connections of a matching pair of nodes to a first matching node and deleting a second matching node of the matching pair of nodes.

19. The system of claim 18, wherein the scaffold network decomposition rule identifies all possible single chemical substructures to be removed from a higher-order scaffold and specifies at least one decomposition of the higher-order scaffold comprising removing one of the possible single chemical substructures from the higher-order scaffold and terminates decomposition if the higher-order scaffold consists of a single ring or linker.

20. The system of claim 15, wherein the R-group relationship rule comprises:
- forming at least one scaffold group and assigning one of the nodes of the relationship network to each scaffold group according to the scaffold relationship rule;
- comparing all R-groups within a collection of R-groups removed from all individual chemical molecule structures specified by each of the plurality of private entries and assigning an additional node to each non-duplicate R-group within the collection of R-groups; and
- for each node assigned to a scaffold group, add a connection between the node assigned to the scaffold group and each node assigned to an R-group removed from any of the private entries associated with the scaffold of the scaffold group.

* * * * *